United States Patent
Aggarwal et al.

(10) Patent No.: US 9,213,082 B2
(45) Date of Patent: Dec. 15, 2015

(54) PROCESSING TIME DETERMINATION FOR WIRELESS POSITION DETERMINATION

(71) Applicant: QUALCOMM Incorporated, San Diego, CA (US)

(72) Inventors: Alok Aggarwal, Foster City, CA (US); Ayman Fawzy Naguib, Cupertino, CA (US); Vinay Sridhara, Sunnyvale, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/859,652

(22) Filed: Apr. 9, 2013

(65) Prior Publication Data
US 2013/0223261 A1    Aug. 29, 2013

Related U.S. Application Data

(63) Continuation of application No. 12/622,289, filed on Nov. 19, 2009.

(60) Provisional application No. 61/116,996, filed on Nov. 21, 2008, provisional application No. 61/117,055, filed on Nov. 21, 2008.

(51) Int. Cl.
*H04J 3/06* (2006.01)
*H04W 4/00* (2009.01)
(Continued)

(52) U.S. Cl.
CPC ............... *G01S 5/10* (2013.01); *G01S 5/0205* (2013.01); *G01S 5/14* (2013.01); *G01S 13/765* (2013.01); *H04W 24/00* (2013.01); *H04W 64/00* (2013.01)

(58) Field of Classification Search
CPC ..... H04W 64/00; H04W 88/08; H04W 28/02; H04W 36/14; H04W 48/20; H04W 64/003; H04W 56/0055

USPC ......... 370/350, 503, 508, 519, 329, 331, 332, 370/333, 338; 455/436, 432.1, 439, 440, 455/452.1, 452.2, 456.3, 457, 524, 525, 455/133-135

See application file for complete search history.

(56) References Cited

U.S. PATENT DOCUMENTS 6,181,253 B1    1/2001    Eschenbach et al.
6,477,380 B1    11/2002    Uehara et al.
(Continued)

FOREIGN PATENT DOCUMENTS

CN    1269947 A    10/2000
CN    1444833 A    9/2003
(Continued)

OTHER PUBLICATIONS

Andre Gunther, et al., "Measuring Round Trip Times to Determine the Distance between WLAN Nodes", Proceedings of Networking 2005, May 6, 2005, pp. 1-12, XP002655207, Waterloo, Canada pp. 1-6.

Awad A., et al., "Adaptive Distance Estimation and Localization in WSM Using RSSI Measures" 10th Euromicro Conference on Gidital System Design Architectures, Methods and Tools (DSD 2007) Los Alamitos, CA IEEE Computer Soc., Piscataway, NJ, US Aug. 29, 2007 pp. 471-478.

Blumenthal J, et al., "Precise Positioning with a Low Complexity Algorithm in Ad hoc Wireless Sensor Networks" Pik. Praxis der Informationsverarbeitung und Kommunikation, Saur, Muenchen, DE LNKD—DOI:10.1515/PIK0.2005.80, [Online] vol. 28, No. 2, Jun. 1, 2005, pp. 80-85, XP002495976.
(Continued)

*Primary Examiner* — Hanh N Nguyen
(74) *Attorney, Agent, or Firm* — Arnold J. Gum; Thomas A. Jolly

(57) ABSTRACT

An example method for determining a processing time for wirelessly determining a position of a mobile station includes: measuring a round trip time delay to each of multiple wireless access points; estimating an initial processing time for each of the wireless access points; calculating the position of the mobile station based upon the measured round trip time delays and estimated processing times; and updating the initial processing time for each of the wireless access points based upon the calculated position of the mobile station.

29 Claims, 10 Drawing Sheets

(51) Int. Cl.

| | | |
|---|---|---|
| G01S 5/10 | (2006.01) | |
| G01S 5/02 | (2010.01) | |
| G01S 5/14 | (2006.01) | |
| H04W 24/00 | (2009.01) | |
| G01S 13/76 | (2006.01) | |
| H04W 64/00 | (2009.01) | |

(56) References Cited

U.S. PATENT DOCUMENTS

| | | |
|---|---|---|
| 6,665,333 B2 | 12/2003 | McCrady et al. |
| 6,681,099 B1 | 1/2004 | Keranen et al. |
| 6,754,488 B1 | 6/2004 | Won et al. |
| 7,006,834 B2 | 2/2006 | Gaal et al. |
| 7,079,851 B2 | 7/2006 | Makuta |
| 7,130,646 B2 | 10/2006 | Wang |
| 7,138,946 B2 | 11/2006 | Tamaki et al. |
| 7,233,800 B2 | 6/2007 | Laroia et al. |
| 7,319,878 B2 | 1/2008 | Sheynblat et al. |
| 7,346,120 B2 | 3/2008 | McCorkle |
| 7,373,156 B2 | 5/2008 | Ruutu et al. |
| 7,383,049 B2 | 6/2008 | Deloach, Jr. et al. |
| 7,469,139 B2 | 12/2008 | Van de Groenendaal |
| 7,525,484 B2 | 4/2009 | Dupray et al. |
| 7,574,216 B2 | 8/2009 | Leitch et al. |
| 7,672,283 B1 | 3/2010 | Chang et al. |
| 7,676,218 B2 | 3/2010 | Ballai |
| 7,716,740 B2 | 5/2010 | Robert et al. |
| 7,751,829 B2 | 7/2010 | Masuoka et al. |
| 7,756,615 B2 | 7/2010 | Barfoot et al. |
| 7,810,154 B2 | 10/2010 | Hum et al. |
| 7,861,123 B1 | 12/2010 | Tamilarasan et al. |
| 7,893,873 B2 | 2/2011 | Black et al. |
| 7,899,006 B2 | 3/2011 | Boyd |
| 7,941,159 B2 | 5/2011 | Walley et al. |
| 7,983,622 B1 | 7/2011 | Vaughan |
| 8,032,153 B2 | 10/2011 | Karr et al. |
| 8,045,996 B2 | 10/2011 | Brunner et al. |
| 8,161,316 B1 | 4/2012 | Manning et al. |
| 8,165,150 B2 | 4/2012 | Aweya et al. |
| 8,238,942 B2 | 8/2012 | Gast |
| 8,244,272 B2 | 8/2012 | Morgan et al. |
| 8,265,652 B2 | 9/2012 | Piersol et al. |
| 2001/0053699 A1 | 12/2001 | McCrady et al. |
| 2002/0173295 A1 | 11/2002 | Nykanen et al. |
| 2003/0125046 A1 | 7/2003 | Riley et al. |
| 2003/0129995 A1 | 7/2003 | Niwa et al. |
| 2003/0182053 A1 | 9/2003 | Swope et al. |
| 2004/0003285 A1 | 1/2004 | Whelan et al. |
| 2004/0023640 A1 | 2/2004 | Ballai |
| 2004/0104842 A1 | 6/2004 | Drury et al. |
| 2004/0189712 A1 | 9/2004 | Rundell |
| 2004/0203539 A1 | 10/2004 | Benes et al. |
| 2004/0203931 A1 | 10/2004 | Karaoguz |
| 2004/0223599 A1 | 11/2004 | Bear et al. |
| 2004/0235499 A1 | 11/2004 | Tanaka et al. |
| 2004/0258012 A1 | 12/2004 | Ishii |
| 2004/0266457 A1 | 12/2004 | Dupray |
| 2005/0055412 A1 | 3/2005 | Kaminsky et al. |
| 2005/0058081 A1 | 3/2005 | Elliott |
| 2005/0130669 A1 | 6/2005 | Mizugaki et al. |
| 2005/0130699 A1 | 6/2005 | Kim |
| 2005/0201533 A1 | 9/2005 | Emam et al. |
| 2005/0208900 A1 | 9/2005 | Karacaoglu |
| 2006/0004911 A1 | 1/2006 | Becker et al. |
| 2006/0012476 A1 | 1/2006 | Markhovsky et al. |
| 2006/0085581 A1 | 4/2006 | Martin |
| 2006/0090169 A1 | 4/2006 | Daniels et al. |
| 2006/0120334 A1 | 6/2006 | Wang et al. |
| 2006/0187028 A1 | 8/2006 | Kiang et al. |
| 2006/0189329 A1 | 8/2006 | Anderson et al. |
| 2006/0195252 A1 | 8/2006 | Orr et al. |
| 2006/0200862 A1 | 9/2006 | Olson et al. |
| 2006/0256838 A1 | 11/2006 | Yarkosky |
| 2007/0002813 A1 | 1/2007 | Tenny et al. |
| 2007/0063896 A1 | 3/2007 | Alban et al. |
| 2007/0078905 A1 | 4/2007 | Gunther et al. |
| 2007/0099646 A1 | 5/2007 | Tanaka et al. |
| 2007/0115842 A1 | 5/2007 | Matsuda et al. |
| 2007/0121560 A1 | 5/2007 | Edge |
| 2007/0135134 A1 | 6/2007 | Patrick |
| 2007/0136686 A1 | 6/2007 | Price et al. |
| 2007/0200759 A1 | 8/2007 | Heidari-Bateni et al. |
| 2007/0265020 A1 | 11/2007 | Cuffaro |
| 2007/0270168 A1 | 11/2007 | Sheynblat |
| 2007/0285306 A1 | 12/2007 | Julian et al. |
| 2008/0002820 A1 | 1/2008 | Shtiegman et al. |
| 2008/0034435 A1 | 2/2008 | Grabarnik et al. |
| 2008/0068257 A1 | 3/2008 | Mizuochi |
| 2008/0069318 A1 | 3/2008 | McClung |
| 2008/0085699 A1 | 4/2008 | Hirano et al. |
| 2008/0097966 A1 | 4/2008 | Choi et al. |
| 2008/0101227 A1 | 5/2008 | Fujita et al. |
| 2008/0101277 A1 | 5/2008 | Taylor et al. |
| 2008/0180315 A1 | 7/2008 | Tarlow et al. |
| 2008/0198811 A1 | 8/2008 | Deshpande et al. |
| 2008/0232297 A1 | 9/2008 | Mizugaki et al. |
| 2008/0250498 A1 | 10/2008 | Butti et al. |
| 2008/0287056 A1 | 11/2008 | Van de Groenendaal |
| 2008/0287139 A1* | 11/2008 | Carlson et al. ............. 455/456.1 |
| 2008/0291883 A1 | 11/2008 | Seok |
| 2008/0299993 A1 | 12/2008 | Gordon et al. |
| 2008/0301262 A1 | 12/2008 | Kinoshita et al. |
| 2009/0011713 A1* | 1/2009 | Abusubaih et al. ........ 455/67.11 |
| 2009/0059797 A1 | 3/2009 | Northcutt et al. |
| 2009/0135797 A1 | 5/2009 | Zhang et al. |
| 2009/0257426 A1 | 10/2009 | Hart et al. |
| 2009/0286549 A1 | 11/2009 | Canon et al. |
| 2010/0020776 A1 | 1/2010 | Youssef et al. |
| 2010/0067393 A1 | 3/2010 | Sakimura et al. |
| 2010/0081451 A1 | 4/2010 | Mueck et al. |
| 2010/0128617 A1 | 5/2010 | Aggarwal et al. |
| 2010/0128637 A1 | 5/2010 | Aggarwal et al. |
| 2010/0130229 A1 | 5/2010 | Sridhara et al. |
| 2010/0130230 A1 | 5/2010 | Aggarwal et al. |
| 2010/0134348 A1 | 6/2010 | Mizuochi |
| 2010/0135178 A1* | 6/2010 | Aggarwal et al. ............. 370/252 |
| 2010/0141515 A1 | 6/2010 | Doucet et al. |
| 2010/0157848 A1 | 6/2010 | Das et al. |
| 2010/0159958 A1 | 6/2010 | Naguib et al. |
| 2010/0172259 A1 | 7/2010 | Aggarwal et al. |
| 2011/0092226 A1 | 4/2011 | Maher et al. |
| 2011/0110293 A1 | 5/2011 | Hart et al. |
| 2011/0173674 A1 | 7/2011 | Thomson et al. |
| 2011/0217987 A1 | 9/2011 | Van de Groenendaal |
| 2011/0269478 A1 | 11/2011 | Das et al. |
| 2012/0129461 A1 | 5/2012 | Venkatraman |
| 2012/0269170 A1 | 10/2012 | Chen et al. |
| 2013/0072227 A1 | 3/2013 | Morgan et al. |
| 2013/0072228 A1 | 3/2013 | Naguib et al. |
| 2013/0121173 A1 | 5/2013 | Chen et al. |
| 2013/0143497 A1 | 6/2013 | Das et al. |
| 2013/0170374 A1 | 7/2013 | Aljadeff |
| 2013/0237246 A1 | 9/2013 | Aggarwal et al. |
| 2013/0286959 A1 | 10/2013 | Lou et al. |
| 2014/0018065 A1 | 1/2014 | Naguib et al. |
| 2014/0269400 A1 | 9/2014 | Aldana et al. |
| 2015/0031402 A1 | 1/2015 | Sridhara et al. |

FOREIGN PATENT DOCUMENTS

| | | |
|---|---|---|
| CN | 1509561 A | 6/2004 |
| CN | 1575017 A | 2/2005 |
| CN | 1747605 A | 3/2006 |
| CN | 1783810 A | 6/2006 |
| CN | 1914939 A | 2/2007 |
| CN | 101000369 A | 7/2007 |
| CN | 101023632 A | 8/2007 |
| CN | 101082665 A | 12/2007 |
| CN | 101455001 A | 6/2009 |
| EP | 1050977 A2 | 11/2000 |
| EP | 1180696 A2 | 2/2002 |
| EP | 1253404 A2 | 10/2002 |
| EP | 1253437 A2 | 10/2002 |

(56) References Cited

FOREIGN PATENT DOCUMENTS

| | | |
|---|---|---|
| EP | 1398913 A2 | 3/2004 |
| EP | 1480483 A2 | 11/2004 |
| EP | 1641183 | 3/2006 |
| EP | 1691170 | 8/2006 |
| EP | 1808708 A2 | 7/2007 |
| EP | 1862811 A2 | 12/2007 |
| EP | 1879370 A1 | 1/2008 |
| EP | 1992964 A2 | 11/2008 |
| EP | 2073562 A1 | 6/2009 |
| JP | 50052993 A | 5/1975 |
| JP | 59046568 A | 3/1984 |
| JP | 8146110 A | 6/1996 |
| JP | 8211141 A | 8/1996 |
| JP | 11313359 A | 11/1999 |
| JP | 11326484 A | 11/1999 |
| JP | 2000244967 A | 9/2000 |
| JP | 2001007764 A | 1/2001 |
| JP | 2001147262 A | 5/2001 |
| JP | 2001268622 A | 9/2001 |
| JP | 2001359146 A | 12/2001 |
| JP | 2002040121 A | 2/2002 |
| JP | 2002051000 A | 2/2002 |
| JP | 2002098747 A | 4/2002 |
| JP | 2002159041 A | 5/2002 |
| JP | 2003510614 A | 3/2003 |
| JP | 2003174665 A | 6/2003 |
| JP | 2003204572 A | 7/2003 |
| JP | 2003279648 A | 10/2003 |
| JP | 2004258009 A | 9/2004 |
| JP | 2004350088 A | 12/2004 |
| JP | 2005140617 A | 6/2005 |
| JP | 2005520139 A | 7/2005 |
| JP | 2005345200 A | 12/2005 |
| JP | 2006013894 A | 1/2006 |
| JP | 2006507500 A | 3/2006 |
| JP | 2006145223 | 6/2006 |
| JP | 2006148457 A | 6/2006 |
| JP | 2006170891 A | 6/2006 |
| JP | 2006311475 A | 11/2006 |
| JP | 2006352810 A | 12/2006 |
| JP | 2007500491 A | 1/2007 |
| JP | 2007089006 A | 4/2007 |
| JP | 2007127584 A | 5/2007 |
| JP | 2007212420 A | 8/2007 |
| JP | 2007248362 A | 9/2007 |
| JP | 2007526445 A | 9/2007 |
| JP | 2007529943 A | 10/2007 |
| JP | 2008026138 A | 2/2008 |
| JP | 2008029003 A | 2/2008 |
| JP | 2008039738 A | 2/2008 |
| JP | 2008054351 A | 3/2008 |
| JP | 2008507866 A | 3/2008 |
| JP | 2008104029 A | 5/2008 |
| JP | 2008122132 A | 5/2008 |
| JP | 2008128728 A | 6/2008 |
| JP | 2008522181 A | 6/2008 |
| JP | 2008527769 A | 7/2008 |
| JP | 2008533436 A | 8/2008 |
| JP | 2008224657 A | 9/2008 |
| JP | 2008233066 A | 10/2008 |
| JP | 2008236516 A | 10/2008 |
| JP | 2009074974 A | 4/2009 |
| JP | 2009150872 A | 7/2009 |
| JP | 2009253494 A | 10/2009 |
| JP | 2010019597 A | 1/2010 |
| JP | 2013167630 A | 8/2013 |
| TW | I240085 B | 9/2005 |
| TW | I250303 B | 3/2006 |
| TW | 200618539 | 6/2006 |
| TW | 200718972 | 5/2007 |
| TW | I292829 B | 1/2008 |
| TW | 200816840 A | 4/2008 |
| TW | I300852 B | 9/2008 |
| WO | 9913662 | 3/1999 |
| WO | 0120260 A1 | 3/2001 |
| WO | 0123904 A2 | 4/2001 |
| WO | WO-02063327 A2 | 8/2002 |
| WO | 2007021292 A2 | 2/2007 |
| WO | 2007056738 A2 | 5/2007 |
| WO | 2008012188 A1 | 1/2008 |
| WO | 2008057737 A2 | 5/2008 |
| WO | WO-2008051124 A1 | 5/2008 |
| WO | 2008066927 | 6/2008 |
| WO | WO-2008085440 A2 | 7/2008 |
| WO | 2008121878 A1 | 10/2008 |
| WO | 2008140880 A1 | 11/2008 |
| WO | WO-2014137545 | 9/2014 |

OTHER PUBLICATIONS

European Search Report—EP12005329—Search Authority—The Hague—Dec. 17, 2012.
European Search Report—EP12005330—Search Authority—The Hague—Dec. 13, 2012.
European Search Report—EP12008413—Search Authority—The Hague—May 8, 2013.
Gerasenko S., et al., "Beacon Signals: What, Why, How, and Where", IEEE Computer Society, Computer, vol. 34, No. 10, pp. 108-110, Oct. 2001, doi:10.1109/2.955103.
Golden Stuart A. et al., "Sensor Measurements for WI-FI Location with Emphasis on Time-of-Arrival Ranging," IEEE Transactions on Mobile Computing, vol. 6 (10), 2007.
International Search Report and Written Opinion—PCT/US2009/065319, International Search Authority—European Patent Office—Jun. 23, 2010.
Israel Martin-Escalona, et al., "Impact of geometry on the accuracy of the passive-TDOA algorithm" Personal, Indoor and Mobile Radio Communications, 2008. PIMRC 2008. IEEE 19th International Symposium on, IEEE, Piscataway, NO, USA, Sep. 15, 2008, pp. 1-6, XP031371602 ISBN: 978-1-4244-2643-0 abstract I I . Passive-TDOA Positioning Algorithm.
Lim Y., et al., "Wireless Intrusion Detection and Response", IEEE, 8 Pages, 2003.
Manolakis D.E., "Efficient Solution and Performance analysis of 3-D Position Estimatin by Trilateration", IEEE Transactions on Aerospace and Electronic Systems, vol. 32, No. 4, Oct. 1996.
Mao, et al., "Wireless sensor network localization techniques" Computer Networks, Elsevier Science Publishers B.V;, Amsterdam, NL LNKD—DOI: 10.1016/J.Comnet.2006.11.018, vol. 51, No. 10, May 6, 2007, pp. 2529-2553, XP022063022 ISSN: 1389-1286.
McCrady, et al. "Mobile Ranging with Low Accuracy Clocks", Radio and Wireless Conference 1999, pp. 85-88.
Murad Abusubaih, et al., "A dual distance measurement scheme for indoor IEEE 802.11 wireless local area networks" Mobile Wireless Communications Networks, 2007 9th IFIP International Conference on, IEEE, Piscataway, NJ, USA, Sep. 19, 2007, pp. 121-125, XP031359266 ISBN: 978-1-4244-1719-3.
Partial International Search Report—PCT/US09/065319, International Search Authority, European Patent Office, Apr. 23, 2010.
Watkins L., et al., "A Passive Approach to Rogue Access Point Detections", IEEE, 6 pages, 2007.
Xinrong Li, et al., "Comparison of indoor geolocation methods in DSSS and OFDM wireless LAN systems" Vehicular Technology Conference, 2000. IEEE VTS Fall VTC 2000. 52nd Sep. 24-28, 2000, Piscataway, NJ, USA,IEEE, vol. 6, Sep. 24, 2000, pp. 3015-3020, XP010525129 ISBN: 978-0-7803-6507-0 abstract p. 3017, right-hand column.
Taiwan Search Report—TW098139792—TIPO—Sep. 29, 2013.
European Search Report—EP14020043—Search Authority—Hague—Apr. 24, 2014.
Taiwan Search Report—TW102121564—TIPO—Mar. 11, 2014.

* cited by examiner

PROCESSING TIME DETERMINATION FOR WIRELESS POSITION DETERMINATION

CROSS-REFERENCE TO RELATED APPLICATIONS

The present application for patent is a continuation application of, and claims priority to, U.S. patent application Ser. No. 12/622,289, entitled "WIRELESS POSITION DETERMINATION USING ADJUSTED ROUND TRIP TIME MEASUREMENTS," and filed Nov. 19, 2009, which claims the benefit of and priority to U.S. Provisional Application No. 61/116,996, entitled "DETERMINATION OF PROCESSING DELAY FOR ACCURATE TWO-WAY RANGING IN A WIRELESS NETWORK," and filed Nov. 21, 2008, and to U.S. Provisional Application No. 61/117,055, entitled "LOCALIZATION VIA SIGNAL STRENGTH," and filed Nov. 21, 2008, each of which is assigned to the assignee hereof and hereby expressly incorporated by reference herein in its entirety.

The present application for patent is related to U.S. Patent Application Pub. No. 2010/0130230, entitled "BEACON SECTORING FOR POSITION DETERMINATION," and filed Nov. 19, 2009, U.S. Patent Application Pub. No. 2010/0128637, entitled "NETWORK-CENTRIC DETERMINATION OF NODE PROCESSING DELAY," and filed Nov. 19, 2009, and U.S. Patent Application Pub. No. 2010/0130229, entitled "WIRELESS-BASED POSITIONING ADJUSTMENTS USING A MOTION SENSOR," and filed Nov. 19, 2009, each of which is assigned to the assignee hereof and expressly incorporated by reference herein.

FIELD OF DISCLOSURE

Aspects of this disclosure generally relate to wireless communication systems, and more specifically, to improved position determination methods and apparatuses for use with and/or by wireless mobile devices.

BACKGROUND

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

In conventional digital cellular networks, position location capability can be provided by various time and/or phase measurement techniques. For example, in CDMA networks, one position determination approach used is Advanced Forward Link Trilateration (AFLT). Using AFLT, a mobile device may compute its position from phase measurements of pilot signals transmitted from a plurality of base stations. Improvements to AFLT have been realized by utilizing hybrid position location techniques, where the mobile station may employ a Satellite Positioning System (SPS) receiver. The SPS receiver may provide position information independent of the information derived from the signals transmitted by the base stations. Moreover, position accuracy can be improved by combining measurements derived from both SPS and AFLT systems using conventional techniques.

However, conventional position location techniques based upon signals provided by SPS and/or cellular base stations may encounter difficulties when the mobile device is operating within a building and/or within urban environments. In such situations, signal reflection and refraction, multipath, and/or signal attenuation can significantly reduce position accuracy, and can slow the "time-to-fix" to unacceptably long time periods. These shortcomings may be overcome by having the mobile device exploit signals from other existing wireless networks, such as Wi-Fi (e.g., IEEE 802.11x standards), to derive position information. Conventional position determination techniques used in other existing wireless networks may utilize round trip time (RTT) measurements derived from signals utilized within these networks.

Utilizing RTT measurement techniques to accurately determine position typically involves knowledge of time delays incurred by the wireless signals as they propagate through various network devices comprising the network. Such delays may be spatially variant due to, for example, multipath and/or signal interference. Moreover, such processing delays may change over time based upon the type of network device and/or the network device's current networking load. In practice, when employing conventional RTT positioning techniques, estimating processing delay times may involve hardware changes in the wireless access points, and/or time-consuming pre-deployment fingerprinting and/or calibration of the operational environment.

Accordingly, it may be desirable to implement various models, alone or in combination, that exploit wireless signal properties (such as, for example, RTT, signal strength, etc.) which can improve position determination while avoiding costly pre-deployment efforts and/or changes to the network infrastructure.

SUMMARY

Exemplary embodiments of the invention are directed to apparatus and methods for wirelessly determining the position of a mobile station. In one embodiment, a method may include measuring a round trip time (RTT) to each of a plurality of wireless access points, and estimating a first distance to each wireless access point based upon the round trip time delay and an initial processing time associated with each wireless access point. The method may further include estimating a second distance to each wireless access point based upon supplemental information, combining the first and second distance estimates to each wireless access point, and calculating the position of the mobile station based upon the combined distance estimates.

In another embodiment, an apparatus for wireless position determination is presented. The apparatus may include a wireless transceiver, a processor coupled to the wireless transceiver, and a memory coupled to the processor. The memory may store executable instructions and data for causing the processor to measure a round trip time (RTT) to each of a plurality of wireless access points, estimate a first distance to each wireless access point based upon the round trip time delay and an initial processing time associated with each wireless access point, estimate a second distance to each wireless access point based upon supplemental information, combine the first and second distance estimates to each wireless access point, and calculate the position of the mobile station based upon the combined distance estimates.

In yet another embodiment, a method for wirelessly determining a position of a mobile station using signals provided by a plurality of wireless access points is presented. The method may include measuring a distance to each wireless access point based upon a wireless signal model and calculating a position of the mobile station based upon the measured distance. The method may further include determining a computed distance to each wireless access point based upon the calculated position of the mobile station, updating the wireless signal model based upon the measured and computed distances to each wireless access point, and determining whether the wireless signal model has converged.

In yet another embodiment, an apparatus for wireless position determination of a mobile station using signals provided by a plurality of wireless access points is presented. The apparatus may include a wireless transceiver, a processor coupled to the wireless transceiver, and a memory coupled to the processor. The memory may store executable instructions and data for causing the processor to measure a distance to each wireless access point based upon a wireless signal model, calculate a position of the mobile station based upon the measured distance, determine a computed distance to each wireless access point based upon the calculated position of the mobile station, update the wireless signal model based upon the measured and computed distances to each wireless access point, and determine whether the wireless signal model has converged.

In yet another embodiment, a method for wirelessly determining a position of a mobile station may include measuring a round trip time delay to each of a plurality of wireless access points and estimating an initial processing time for each of the wireless access points. The method may further include calculating the position of the mobile station based upon the measured round trip time delays and estimated processing times, and updating the estimated processing time for each of the wireless access points based upon the calculated position of the mobile station.

In yet another embodiment, an apparatus for wirelessly determining a position of a mobile station may include a wireless transceiver, a processor coupled to the wireless transceiver, and a memory coupled to the processor. The memory may store executable instructions and data for causing the processor to measure a round trip time delay to each of a plurality of wireless access points, estimate an initial processing time for each of the wireless access points, calculate the position of the mobile station based upon the measured round trip time delays and estimated processing times, and update the estimated processing time for each of the wireless access points based upon the calculated position of the mobile station.

Various embodiments may benefit from having wireless access points which do not require knowledge of their processing times and/or require providing this information to mobile stations using beacons, ranging packets, and/or lookup tables. Such advantages can reduce the burden on wireless access point manufacturers, which may be able to avoid modifications their hardware and/or protocols. Moreover, various embodiments may permit reducing the complexity of maintaining a central database of the processing time values for different manufactures of wireless access points.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/ or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
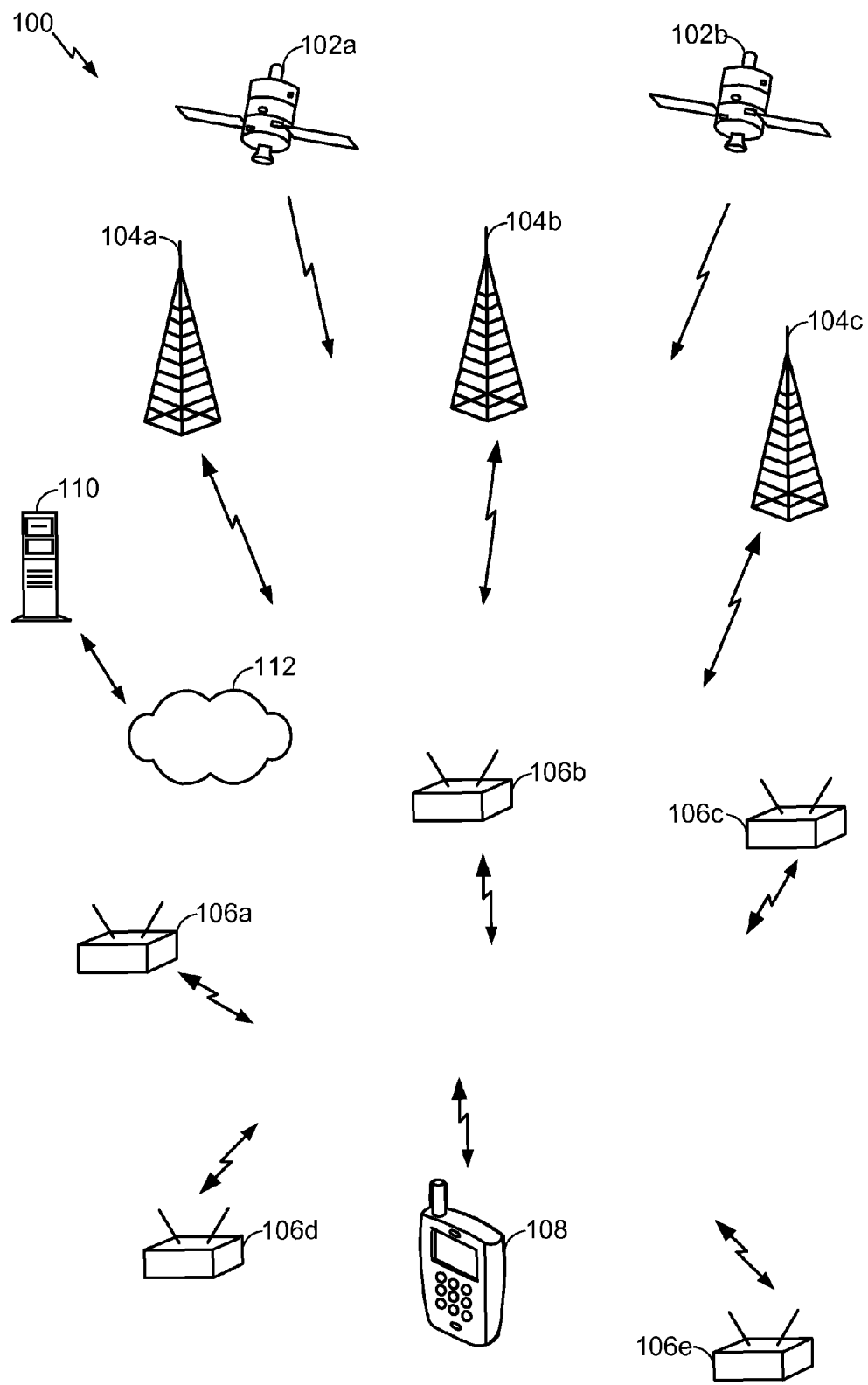
FIG. 1 is a diagram of an exemplary operating environment for a mobile station consistent with embodiments of the disclosure.

FIG. 1 is a diagram of an exemplary operating environment 100 for a mobile station 108. Embodiments of the invention are directed to a mobile station 108 which may utilize a combination of range models and/or for determining position. Other embodiments may adaptively change the ranging models, such as, for example, using round trip time measurements (RTTs) that are adjusted to accommodate for processing delays introduced by wireless access points. The processing delays may vary among different access points and may also change over time. By using supplemental information, such as, for example, a received signal strength indicator (RSSI), the base station may determine position and/or calibrate out the effects of the processing delays introduced by the wireless access points using iterative techniques.

The operating environment 100 may contain one or more different types of wireless communication systems and/or wireless positioning systems. In the embodiment shown in FIG. 1, a Satellite Positioning System (SPS) 102 may be used as an independent source of position information for the mobile station 108. The mobile station 108 may include one or more dedicated SPS receivers specifically designed to receive signals for deriving geo-location information from the SPS satellites.

The operating environment 100 may also include a plurality of one or more types Wide Area Network Wireless Access Points (WAN-WAPs) 104, which may be used for wireless voice and/or data communication, and as another source of independent position information for mobile station 108. The WAN-WAPs 104 may be part of wide area wireless network (WWAN), which may include cellular base stations at known locations, and/or other wide area wireless systems, such as, for example, WiMAX (e.g., 802.16). The WWAN may include other known network components which are not shown in FIG. 1 for simplicity. Typically, each WAN-WAPs 104a-104c within the WWAN may operate from fixed positions, and provide network coverage over large metropolitan and/or regional areas.

The operating environment 100 may further include Local Area Network Wireless Access Points (LAN-WAPs) 106, may be used for wireless voice and/or data communication, as well as another independent source of position data. The LAN-WAPs can be part of a Wireless Local Area Network (WLAN), which may operate in buildings and perform communications over smaller geographic regions than a WWAN. Such LAN-WAPs 106 may be part of, for example, WiFi networks (802.11x), cellular piconets and/or femtocells, Bluetooth Networks, etc.

The mobile station 108 may derive position information from any one or a combination of the SPS satellites 102, the WAN-WAPs 104, and/or the LAN-WAPs 106. Each of the aforementioned systems can provide an independent estimate of the position for mobile station 108 using different techniques. In some embodiments, the mobile station may combine the solutions derived from each of the different types of access points to improve the accuracy of the position data.

When deriving position using the SPS 102, the mobile station may utilize a receiver specifically designed for use with the SPS that extracts position, using conventional techniques, from a plurality of signals transmitted by SPS satellites 102. The method and apparatus described herein may be used with various satellite positioning systems, which typically include a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

When deriving position from the WWAN, each WAN-WAPs 104a-104c may take the form of base stations within a digital cellular network, and the mobile station 108 may include a cellular transceiver and processor that can exploit the base station signals to derive position. It should be understood that digital cellular network may include additional base stations or other resources show in FIG. 1. While WAN-WAPs 104 may actually be moveable or otherwise capable of being relocated, for illustration purposes it will be assumed that they are essentially arranged in a fixed position.

The mobile station 108 may perform position determination using known time-of-arrival techniques such as, for example, Advanced Forward Link Trilateration (AFLT). In other embodiments, each WAN-WAP 104a-104c may take the form of WiMax wireless networking base station. In this case, the mobile station 108 may determine its position using time-of-arrival (TOA) techniques from signals provided by the WAN-WAPs 104. The mobile station 108 may determine positions either in a stand alone mode, or using the assistance of a positioning server 110 and network 112 using TOA techniques, as will be described in more detail below. Note that embodiments of the disclosure include having the mobile station 108 determine position information using WAN-WAPs 104 which are different types. For example, some WAN-WAPs 104 may be cellular base stations, and other WAN-WAPs may be WiMax base stations. In such an operating environment, the mobile station 108 may be able to exploit the signals from each different type of WAN-WAP, and further combine the derived position solutions to improve accuracy.

When deriving position using the WLAN, the mobile station 108 may utilize time of arrival techniques with the assistance of the positioning server 110 and the network 112. The positioning server 110 may communicate to the mobile station through network 112. Network 112 may include a combination of wired and wireless networks which incorporate the LAN-WAPs 106. In one embodiment, each LAN-WAP 106a-106e may be, for example, a WiFi wireless access point, which is not necessarily set in a fixed position and can change location. The position of each LAN-WAP 106a-106e may be stored in the positioning server 110 in a common coordinate system. In one embodiment, the position of the mobile station 108 may be determined by having the mobile station 108 receive signals from each LAN-WAP 106a-106e. Each signal may be associated with its originating LAN-WAP based upon some form of identifying information that may be included in the received signal (such as, for example, a MAC address). The mobile station 108 may then derive the time delays associated with each of the received signals. The mobile station 108 may then form a message which can include the time delays and the identifying information of each of the LAN-WAPs, and send the message via network 112 to the positioning server 110. Based upon the received message, the positioning server may then determine a position, using the stored locations of the relevant LAN-WAPs 106, of the mobile station 108. The positioning server 110 may generate and provide a Location Configuration Information (LCI) message to the base station that includes a pointer to the mobile station's position in a local coordinate system. The LCI message may also include other points of interest in relation to the location of the mobile station 108. When computing the position of the mobile station 108, the positioning server may take into account the different delays which can be introduced by elements within the wireless network.

The position determination techniques described herein may be used for various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 2:
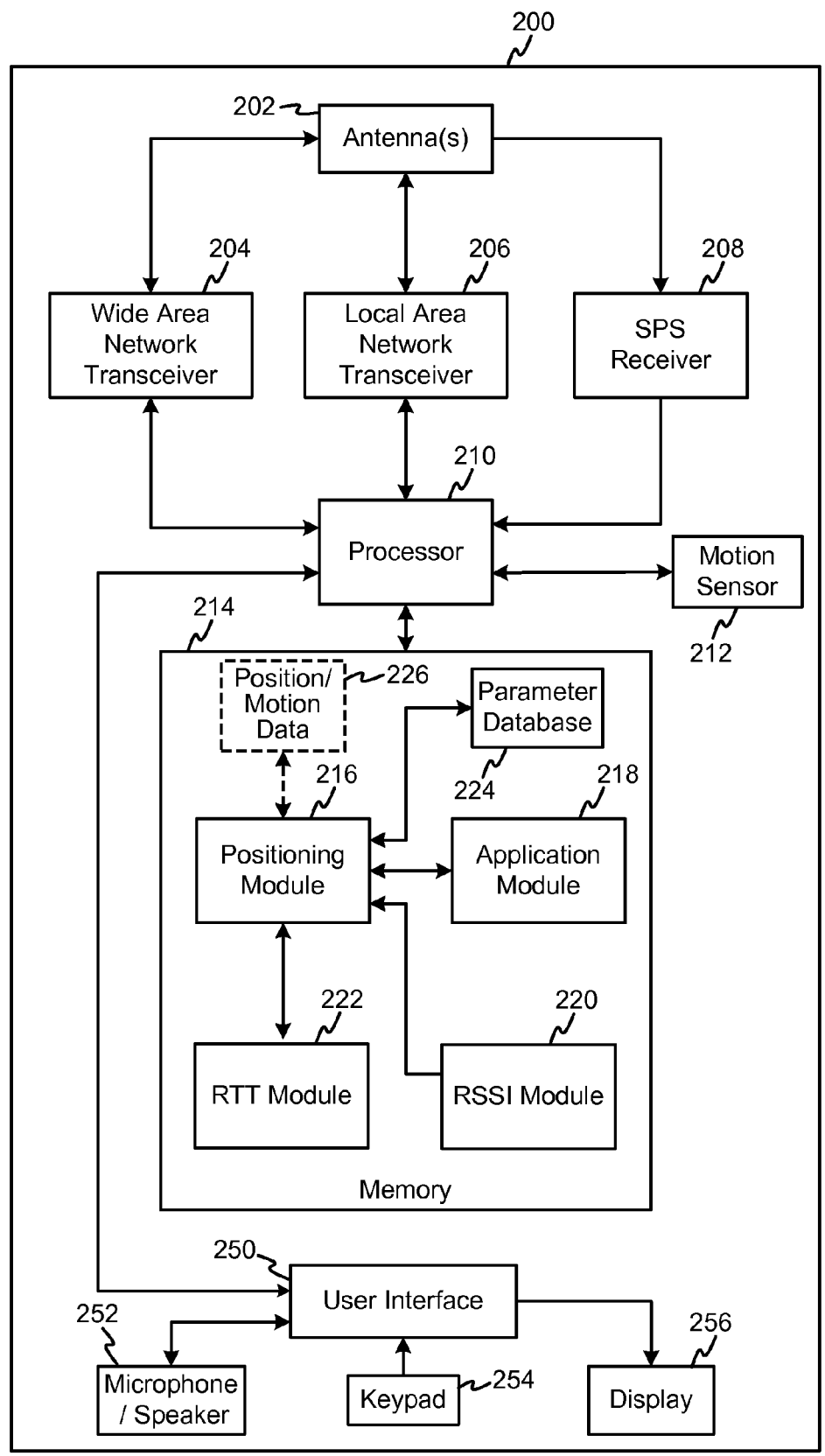
FIG. 2 is a block diagram illustrating various components of an exemplary mobile station.

FIG. 2 is a block diagram illustrating various components of an exemplary mobile station 200. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile station may include one or more wide area network transceiver(s) 204 that may be connected to one or more antennas 202. The wide area network transceiver 204 comprises suitable devices, hardware, and/or software for communicating with and/or detecting signals to/from WAN-WAPs 104, and/or directly with other wireless devices within a network. In one aspect, the wide area network transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wireless networking technologies may be used, for example, WiMax (802.16), etc. The mobile station may also include one or more local area network transceivers 206 that may be connected to one or more antennas 202. The local area network transceiver 206 comprises suitable devices, hardware, and/or software for communicating with and/or detecting signals to/from LAN-WAPs 106, and/or directly with other wireless devices within a network. In one aspect, the local area network transceiver 206 may comprise a WiFi (802.11x) communication system suitable for communicating with one or more wireless access points; however in other aspects, the local area network transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106 and/or WAN-WAPs 104. Specifically, in the description presented below, when the term "WAP" is used, it should be understood that embodiments may include a mobile station 200 that can exploit signals from a plurality of LAN-WAPs 106, a plurality of WAN-WAPs 104, or any combination of the two. The specific type of WAP being utilized by the mobile station 200 may depend upon the environment of operation. Moreover, the mobile station 200 may dynamically select between the various types of WAPs in order to arrive at an accurate position solution.

An SPS receiver 208 may also be included in mobile station 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile station's 200 position using measurements obtained by any suitable SPS algorithm.

A motion sensor 212 may be coupled to processor 210 to provide relative movement and/or orientation information which is independent of motion data derived from signals received by the wide area network transceiver 204, the local area network transceiver 206 and the SPS receiver 208. By way of example but not limitation, motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, motion sensor 212 may include a plurality of different types of devices and combine their outputs in order to provide motion information.

A processor 210 may be connected to the wide area network transceiver 204, local area network transceiver 206, the SPS receiver 208 and the motion sensor 212. The processor may include one or more microprocessors, microcontrollers, and/or digital signal processors that provide processing functions, as well as other calculation and control functionality. The processor 210 may also include memory 214 for storing data and software instructions for executing programmed functionality within the mobile station. The memory 214 may be on-board the processor 210 (e.g., within the same IC package), and/or the memory may be external memory to the processor and functionally coupled over a data bus. The details of software functionality associated with aspects of the disclosure will be discussed in more detail below.

A number of software modules and data tables may reside in memory 214 and be utilized by the processor 210 in order to manage both communications and positioning determination functionality. As illustrated in FIG. 2, memory 214 may include and/or otherwise receive a positioning module 216, an application module 218, a received signal strength indicator (RSSI) module 220, and a round trip time (RTT) module 222. One should appreciate that the organization of the memory contents as shown in FIG. 2 is merely exemplary, and as such the functionality of the modules and/or data structures may be combined, separated, and/or be structured in different ways depending upon the implementation of the mobile station 200.

The application module 218 may be a process running on the processor 210 of the mobile device 200, which requests position information from the positioning module 216. Applications typically run within an upper layer of the software architectures, and may include Indoor Navigation, Buddy Locator, Shopping and Coupons, Asset Tracking, and location Aware Service Discovery. The positioning module 216 may derive the position of the mobile device 200 using information derived from the RTTs measured from signals exchanged with a plurality of WAPs. In order to accurately determine position using RTT techniques, reasonable estimates of processing time delays introduced by each WAP may be used to calibrate/adjust the measured RTTs. The measured RTTs may be determined by the RTT module 222, which can measure the timings of signals exchanged between the mobile station 200 and the WAPs to derive round trip time (RTT) information.

Once measured, the RTT values may be passed to the positioning module 216 to assist in determining the position of the mobile device 200. The positioning module 216 may use supplemental information to estimate the processing times of the WAPs. In one embodiment, the amplitude values of the signals transmitted by the WAPs may be used to provide this information. These amplitude values may be determined in the form of RSSI measurements determined by RSSI module 220. The RSSI module 220 may provide amplitude and statistical information regarding the signals to the position module 216. The position module may then estimate the processing times to calibrate the RTT measurements and accurately determine position. The position may then be output to the application module 218 in response to its aforementioned request. In addition, the positioning module 216 may utilize a parameter database 224 for exchanging operational parameters. Such parameters may include the determined processing times for each WAP, the WAPs positions in a common coordinate frame, various parameters associated with the network, initial processing time estimates, processing time estimates determined previously, etc. Details of these parameters will be provided in subsequent sections below.

In other embodiments, the supplemental information may optionally include auxiliary position and/or motion data which may be determined from other sources. The auxiliary position data may be incomplete or noisy, but may be useful as another source of independent information for estimating the processing times of the WAPs. As illustrated in FIG. 2 using dashed lines, mobile device 200 may optionally store auxiliary position/motion data 226 in memory which may be derived from information received other sources as described below. Moreover, in other embodiments, supplemental information may include, but not be limited to, information that can be derived or based upon Bluetooth signals, beacons, RFID tags, and/or information derived from map (e.g., receiving coordinates from a digital representation of a geographical map by, for example, a user interacting with a digital map).

In one embodiment, all or part of auxiliary position/motion data 226 may be derived from information supplied by motion sensor 212 and/or SPS receiver 208. In other embodiments, auxiliary position/motion data 226 may be determined through additional networks using non-RTT techniques (e.g., AFLT within a CDMA network). In certain implementations, all or part of auxiliary position/motion data 226 may also be provided by way of motion sensor 212 and/or SPS receiver 208 without further processing by processor 210. In some embodiments, the auxiliary position/motion data 226 may be directly provided by the motion sensor 212 and/or SPS receiver 208 to the processing unit 210. Position/motion data 226 may also include acceleration data and/or velocity data which may provide direction and speed. In other embodiments, position/motion data 226 may further include directionality data which may only provide direction of movement.

While the modules shown in FIG. 2 are illustrated in the example as being contained in memory 214, it is recognized that in certain implementations such procedures may be provided for or otherwise operatively arranged using other or additional mechanisms. For example, all or part of positioning module 216 and/or application module 218 may be provided in firmware. Additionally, while in this example positioning module 216 and application module 218 are illustrated as being separate features, it is recognized, for example, that such procedures may be combined together as one procedure or perhaps with other procedures, or otherwise further divided into a plurality of sub-procedures.

Processor 210 may include any form of logic suitable for performing at least the techniques provided herein. For example, processor 210 may be operatively configurable based on instructions in memory 214 to selectively initiate one or more routines that exploit motion data for use in other portions of the mobile device.

The mobile station 200 may include a user interface 250 which provides any suitable interface systems, such as a microphone/speaker 252, keypad 254, and display 256 that allows user interaction with the mobile station 200. The microphone/speaker 252 provides for voice communication services using the wide area network transceiver 204 and/or the local area network transceiver 206. The keypad 254 comprises any suitable buttons for user input. The display 256 comprises any suitable display, such as, for example, a backlit LCD display, and may further include a touch screen display for additional user input modes.

As used herein, mobile station 108 may be any portable or movable device or machine that is configurable to acquire wireless signals transmitted from, and transmit wireless signals to, one or more wireless communication devices or networks. As shown in FIGS. 1 and 2, the mobile device is representative of such a portable wireless device. Thus, by way of example but not limitation, mobile device 108 may include a radio device, a cellular telephone device, a computing device, a personal communication system (PCS) device, or other like movable wireless communication equipped device, appliance, or machine. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

As used herein, the term "wireless device" may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

I. Models for Wireless Position Determination

Figure 3:
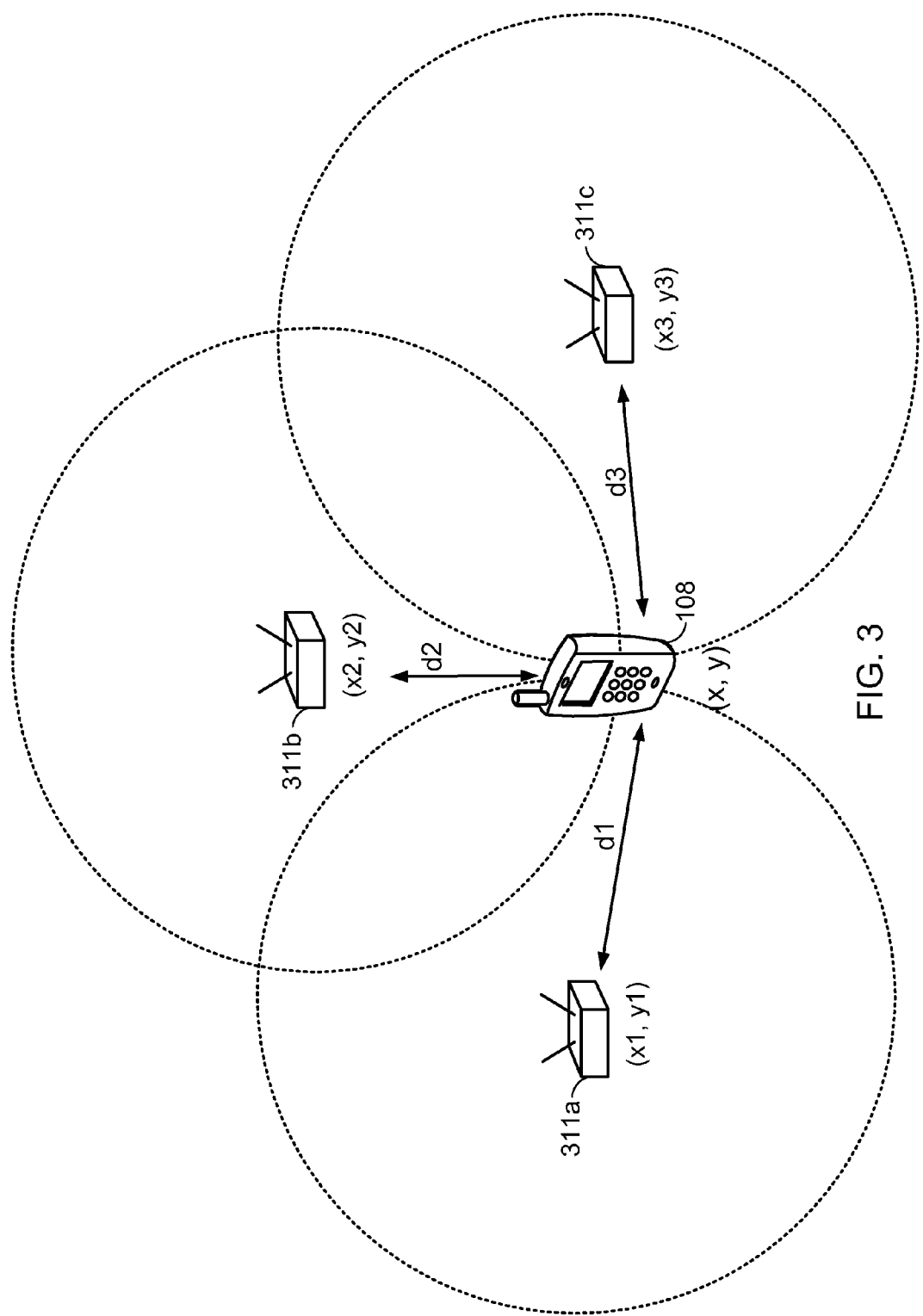
FIG. 3 is diagram illustrating an exemplary technique for determining a position of a mobile station using information obtained from a plurality of wireless access points.

A simplified environment is shown in FIG. 3 for illustrating an exemplary technique for determining a position of mobile station 108. The mobile station 108 may communicate wirelessly with a plurality of WAPs 311 using RF signals (e.g., 2.4 GHz) and standardized protocols for the modulation of the RF signals and the exchanging of information packets (e.g., IEEE 802.11). By extracting different types of information from the exchanged signals, and utilizing the layout of the network (i.e., the network geometry) the mobile station 108 may determine its position in a predefined reference coordinate system. As shown in FIG. 3, the mobile station may specify its position (x, y) using a two-dimensional coordinate system; however, embodiments disclosed herein are not so limited, and may also be applicable to determining positions using a three-dimensional coordinate system, if the extra dimension is desired. Additionally, while three WAPS 311a-311c are shown in FIG. 3, embodiments may utilize additional WAPs and solve for position using techniques applicable to over-determined systems, which can average out various errors introduced by different noise effects, and thus improve the accuracy of the determined position. In order to determine its position (x, y), the mobile station 108 may first need to determine the network geometry. The network geometry can include the positions of each of the WAPS 311 in a reference coordinate system $((x_k, y_k)$, where $k=1, 2, 3)$. The network geometry may be provided to the mobile station 108 in any manner, such as, for example, providing this information in beacon signals, providing the information using a dedicated server external on an external network, providing the information using uniform resource identifiers, etc.

The mobile station may then determine a distance ($d_k$, where $k=1, 2, 3$) to each of the WAPs 311. As will be described in more detail below, there are a number of different approaches for estimating these distances ($d_k$) by exploiting different characteristics of the RF signals exchanged between the mobile station 108 and WAPs 311. Such characteristics may include, as will be discussed below, the round trip propagation time of the signals, and/or the strength of the signals (RSSI).

In other embodiments, the distances ($d_k$) may in part be determined or refined using other sources of information that are not associated with the WAPs. For example, other positioning systems, such as GPS, may be used to provide a rough estimate of $d_k$. (Note that it is likely that GPS may have insufficient signal in the anticipated operating environments (indoors, metropolitan, etc.) to provide a consistently accurate estimate of $d_k$. However GPS signals may be combined with other information to assist in the position determination process.) Other relative positioning devices may reside in the mobile station 108 which can be used as a basis to provide rough estimates of relative position and/or direction (e.g., on-board accelerometers).

Once each distance is determined, the mobile station can then solve for its position (x, y) by using a variety of known geometric techniques, such as, for example, trilateration. From FIG. 3, it can be seen that the position of the mobile station 108 ideally lies at the intersection of the circles drawn using dotted lines. Each circle being defined by radius $d_k$ and center $(x_k, y_k)$, where $k=1, 2, 3$. In practice, the intersection of these circles may not lie at a single point due to the noise and other errors in the networking system.

Sections 1 and 2 below will discuss in more detail the following wireless signal models: 1) exemplary models relating distance and wireless signal round trip time, and 2) exemplary models relating distance and wireless signal strength. As both of the exemplary models relate distance to different signal parameters, they may also be referred to as "ranging" models. One should appreciate that various embodiments of the invention are not limited to these ranging models, and that other wireless signal models may be used.

1. Determining Distance Using a Round Trip Time (RTT) Ranging Model

Determining the distance between the mobile station 108 and each WAP 311 may involve exploiting time information of the RF signals. In one embodiment, determining the round trip time (RTT) of signals exchanged between the mobile station 108 and a WAP 311 can be performed and converted to a distance ($d_k$). RTT techniques can measure the time between sending a data packet and receiving a response. These methods utilize calibration to remove any processing delays. In some environments, it may be assumed that the processing delays for the mobile station and the wireless access points are the same. However, such an assumption may not be true in practice.

Figure 4:
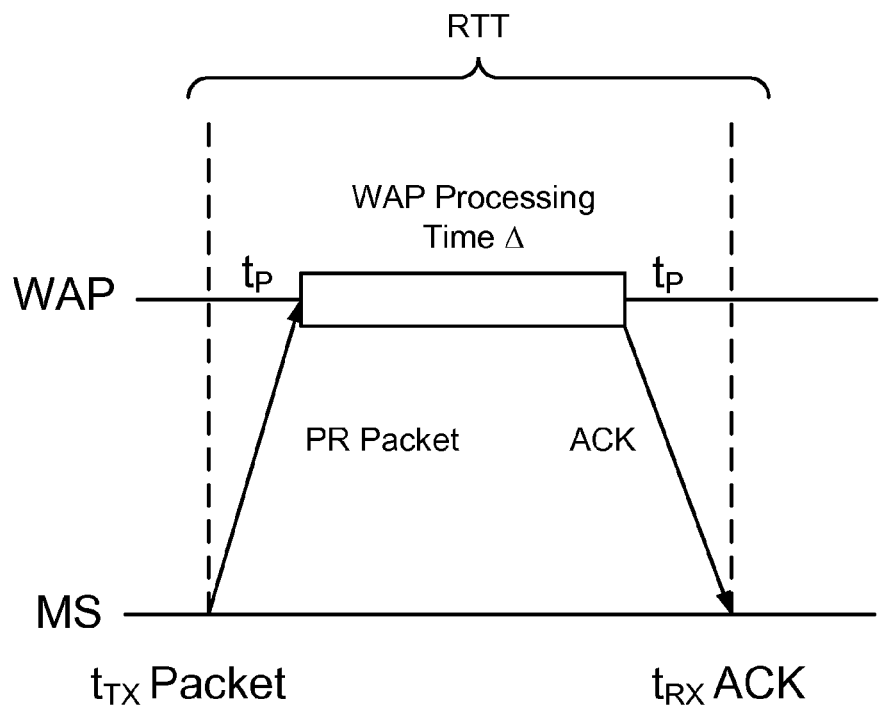
FIG. 4 is a diagram showing exemplary timings within a round trip time (RTT) occurring during a wireless probe request and a response.

FIG. 4 is a diagram showing exemplary timings within a round trip time (RTT) occurring during a wireless probe request and a response. In one embodiment, the response may take the form of an acknowledgement packet (ACK); however, any type of response packet would be consistent with various embodiments of the invention. For example, an RTS (request to send) transmit packet and/or CTS (clear to send) response packet may be suitable.

To measure the RTT with respect to a given WAP 311$k$, the mobile station 108 may send a directed probe request to WAP 311$k$, and then record the time the probe request packet was sent ($t_{TX}$ Packet) as shown on the mobile station (MS) time-line in FIG. 4. After a propagation time $t_P$ from the mobile station 108 to the WAP 311$k$, the WAP will receive the packet. The WAP 311$k$ may then process the directed probe request and may send an ACK back to the mobile station 108 after some processing time $\Delta$ as shown on the WAP timeline in FIG. 4. After a second propagation time $t_P$, the mobile station 108 may record the time the ACK packet was received ($t_{RX}$ ACK) as shown on the MS time line. The mobile station may then determine the RTT as the time difference $t_{RX}$ ACK−$t_{TX}$ Packet.

If the mobile station 108 knows the WAP 311$k$ processing time $\Delta$, it can then estimate the propagation time to the WAP 311$k$ as (RTT−$\Delta$)/2, which will correspond to the distance ($d_k$) between the mobile station 108 and the WAP 311$k$. However, since the mobile station 108 typically has no knowledge of the WAP 311$k$ processing time, the mobile station 108 should obtain an accurate estimate of the processing time $\Delta$ before it can estimate the distance to the WAP 311$k$. Various techniques presented below will describe embodiments where the mobile station 108 processes the collected RSSI and RTT measurements to three or more WAPs 311 to accurately estimate the WAPs 311 processing times to allow the determination of the mobile station's position in space.

One will appreciate that by using a directed probe request based RTT ranging as described above, the wireless device 108 does not need to associate with any of the WAPs 311. Since a directed access probe is considered a unicast packet, the WAP will typically ACK a successful decoding of an access probe packet after a prescribed period of time. The ability to do this ranging without having to associate with the WAPs 311 may greatly reduce the extra overhead involved.

The round-trip time between the mobile station 108 and WAP k may be analyzed in a ranging model as follows:

$$RTT_k = 2d_k + \Delta_k + \Delta_{MS} + n_k$$

where:
- $d_k$ is the actual distance between the mobile station 108 and WAP 311$k$ (ft).
- $\Delta_k$ is the hardware processing time of the $k^{th}$ WAP (ns).
- $\Delta_{MS}$ is the hardware processing time at the mobile station 108 (ns). Here may be assumed that the processing delay can be calibrated out the by the mobile station 108. Accordingly, it can be set to be zero.
- $n_k = n_{z,k} + n_{MS,k} + n_{AP,k}$, which is the error in the RTT measurement (ns). This error is the sum of the errors due to unknown WAP height, mobile station timing errors, and WAP timing errors.

One should appreciate that given because the units of distance are provided in feet, and the units of distance are provided in nano-seconds, the velocity of light may be approximated as unity to simplify the model and reduce computation time by avoiding multiply operations.

The overall noise $n_k$ may be the sum of the WAP height, mobile station timing, and WAP timing errors listed above. After combining all these errors, the resulting probability density function may be very close to Gaussian. Thus, the noise may be modeled as Gaussian with the distance-dependent mean and standard deviation.

2. Determining Distance Using Signal Strength (RSSI) Ranging Model

Figure 5:
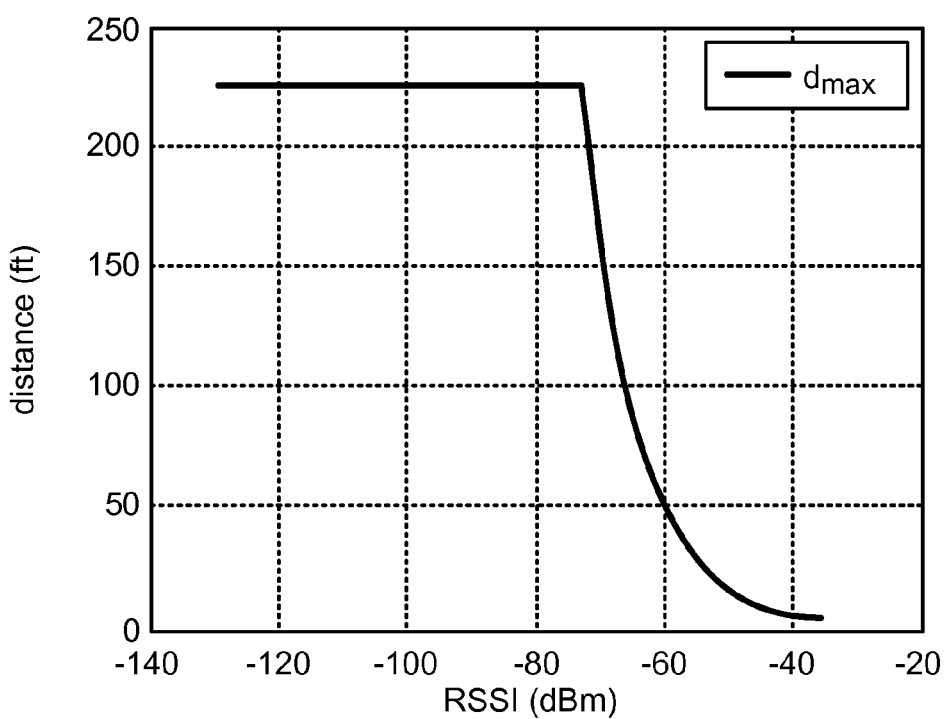
FIG. 5 is a graph illustrating an exemplary relationship of a received signal strength indication (RSSI) and the distance between a mobile station and a wireless access point.

The distance between each WAP 311 and the mobile station 108 may also be estimated using information in addition to RTT for obtaining an estimate of the processing times explained above. This information is generally referred to herein as supplemental information. One form of supplemental information may take the form of the measured signal strength (RSSI) associated with the ACK packets received from each WAP 311. FIG. 5 is a graph illustrating an exemplary relationship of RSSI and the distance between a mobile station and a wireless access point.

In order to effectively exploit RSSI, the mobile station 108 may utilize an approximate ranging model of distance, and variance of the distance, as a function of the received signal strength (RSSI). This model may be used when the mobile station 108 is initially trying to learn the WAP processing delays. One feature of the RTT-based positioning algorithm is that the RSSI model can be extremely simple, without the need for extensive pre-deployment fingerprinting. In one embodiment, the model may assume that the only RSSI information known to the mobile station is the approximate maximum distance $d_{max}$, in feet, as a function of RSSI in dBm. Based on initial propagation simulations for an indoor environment with WAPs having a maximum range of 225 feet, this function is provided below in Eq. 2, which is graphed in FIG. 5.

$$d_{max}(RSSI) = \min\left(10^{\frac{-(RSSI+25.9)}{20.0}}, 225\right)$$

From the above distance bound, the mobile station 108 may convert any measured RSSI to a distance estimate that may be modeled as normally distributed with the following relationships in Eqs. 3 and 4:

$$d_{RSSI} = \frac{d_{max}(RSSI)}{2}$$

$$\sigma^2_{d_{RSSI}} = \frac{d^2_{max}(RSSI)}{16}$$

where the variance assumes that $4\sigma_{d_{RSSI}} = d_{max}$.

In other embodiments, the mobile station could also model the minimum distance as a function of signal strength. However, for 2-D positioning, it is possible that a mobile station is close to a WAP in the X-Y plane (the distance utilized for positioning purposes), but sees arbitrary signal strength because of distance and obstacles in the Z-dimension. Thus, the simple RSSI model takes the minimum distance vs. signal strength as 0 ft for all RSSI.

II. Combining Ranging Models for Wireless Position Determination

The follow description provides details for a mobile station centric algorithm for position determination using ranging models which can be based upon RTT and other supplemental measurements, such as, for example, RSSI. In this embodiment, the mobile device 108 may estimate distances to three or more wireless access points using the two or more ranging models. Each wireless access point has positions which are known to the mobile device by providing the network geometry information using techniques mentioned above. Using these distance estimates and the location of the wireless access points 311, the mobile station 108 can determine its position using known positioning techniques.

The following assumptions may be utilized in this embodiment:

1. The mobile station 108 has the WAP 311 positions in a local or global coordinate system (which may be obtained using methods described above).
2. The mobile station 108 is within radio range of at least three non co-linear WAPs 311 for two-dimensional positioning.
3. There is a consistent processing time between when a WAP receives a unicast packet to when it sends an ACK response (i.e. the processing time has low-variance).
4. Each WAP 311 may have a different processing time delay.
5. The mobile station 108 may be able to make a nanosecond scale measurement of RTT. This may require changes to the current mobile station 108 chipsets in the wireless transceivers 204 and/or 206.
6. The mobile station 108 has an approximate model of distance as a function of RSSI.
7. A complete set of RSSI and RTT measurements (to all target WAPs) can be completed fast enough such that the mobile station 108 can be considered stationary while the measurements are taken; and
8. The mobile station 108 has a method of determining when it has moved to a new location based on significant changes in RSSI, RTT, elapsed time since the last set of measurements, and/or additional sensor data (such as for example, motion sensor 212).

Figure 6:
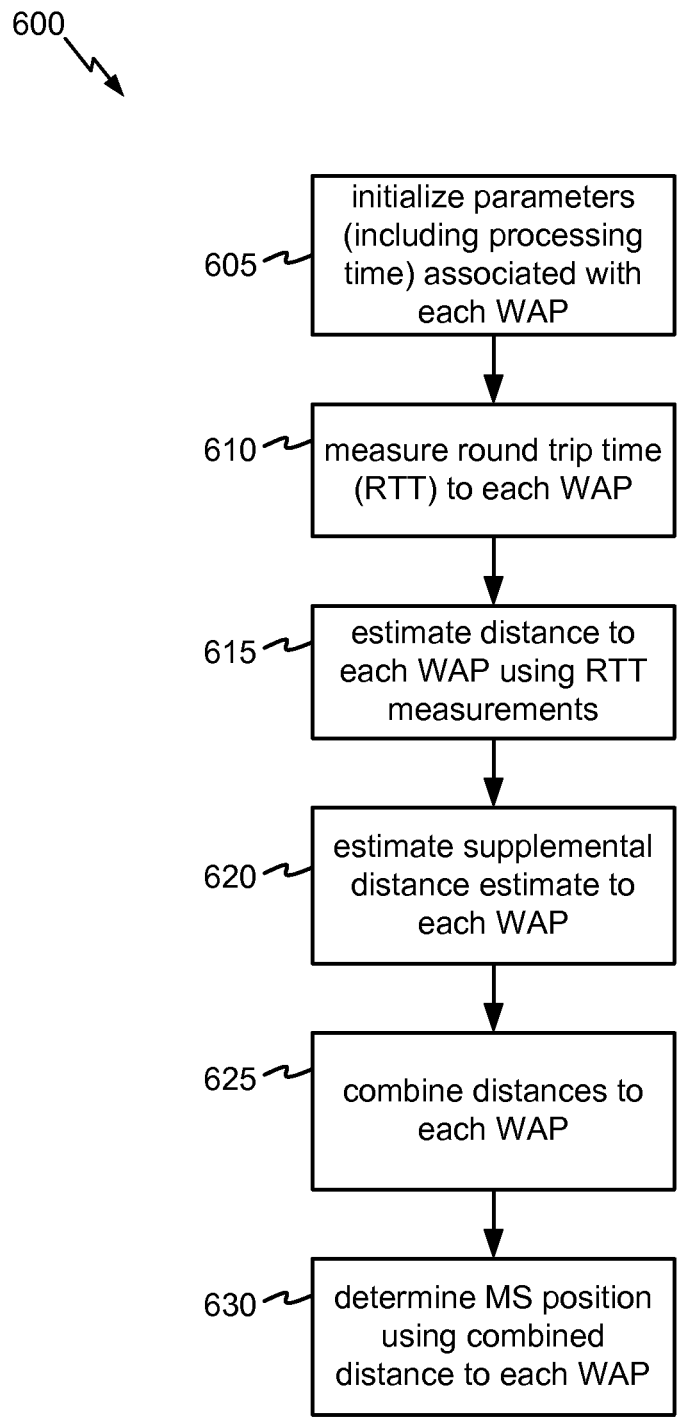
FIG. 6 is a flowchart showing an exemplary process for combining wireless signal models to improve the position determination of a mobile station.

FIG. 6 is a flowchart showing an exemplary method 600 for combining ranging models to improve the position determination of the mobile station 108. The method may be performed at the mobile station 108 on processor 210 using various modules and data stored in memory 214.

Upon entering a new environment, the mobile device 108 may initialize parameters/models associated with each WAP 311k (where k=1, . . . , N) used for position determination (Block 605).

Accordingly, for each WAP 311k, the parameters/models may include:

1. The location in a local or universal coordinate system.
2. An identifier for the network associated with the WAP (e.g., an SSID).
3. An identifier associated with the WAP hardware (e.g., a MACID).
4. An initial processing time delay estimate and variance.
5. For some embodiments, a model of distance vs. signal strength (RSSI).

Once the above parameters are obtained (where they may have been downloaded from server 110), they may be stored in memory in a parameter database 224. Parameters 1-3 above may be obtained from annotations from a map, as described above. In alternative embodiments, parameters 2 and 3 may be learned by the mobile station 108 by listening to beacons that may be provided by the WAPs 311 (e.g., for a WiFi network, mobile station 108 may determine the SSID and the MACID from standard beacon signals). Parameter 4 above may be an a priori coarse initial estimate based upon WAP specifications, and/or a more refined value learned previously by the mobile station 108. Alternatively, the initial processing time read from the parameter database 224 may have been provided from the server 110, which may have been previously learned by mobile station 108, or by another mobile station.

As provided above in the description of FIG. 4, the processing time for each WAP 311 $\Delta_k$ may be the turnaround time for sending a response to a unicast packet. For example, in 802.11a or 802.11g WiFi networks, this processing time may correspond to a delay known as the short interframe space (SIFS) and typically lies within 16000±900 ns for a 20 MHz channel. Let $\Delta_k$ be the actual, unknown processing delay for WAP 311k, and let $\hat{\Delta}_k$ be the mobile station best estimate of the processing delay. The mobile station 108 can initially take $\hat{\Delta}_k=16000$ with a variance of $\sigma_{\hat{\Delta},k}^2=300^2$ (assuming a normal distribution with 3σ=900). Alternatively, the mobile device can obtain the initial processing delays for a WAP 311k by using its hardware identifier (e.g., a MACID) in a local cache that can be stored in parameter database 224, or an external database to obtain an estimate of the processing time.

As will be discussed in more detail below, some embodiments may use a model of distance vs. RSSI for each WAP 311 that can map each signal strength measurement $RSSI_k$ to a distance that may be normally distributed with mean $d_{RSSI,k}$ and variance $\sigma_{d_{RSSI},k}^2$. If no model is available, the mobile device can use a default model (such as, for example, the model described above in Eq. 2).

After initialization in Block 605, the mobile station 108 may measure round trip time (RTT) to each WAP 311 (B610). Here, the mobile station 108, either using the wide area network transceiver 204, the local area network transceiver 206, or a combination of the two, may send a directed probe request using the each WAP 311 based upon the hardware identifier (e.g., MACID for WAP 311k). By using, for example, directed probe requests, the mobile station can perform RTT ranging measurements without associating with the WAPs 311. This can avoid the problem of not being able to utilize WAPs for RTT measurements which are locked down using some form of wireless encryption (e.g., WEP, WAP, RADIUS, etc.) and require a pass-code for access. However, one should appreciate that embodiments are not limited to probe request packets, and other types of packets may be used. Once a WAP processes the probe request, it may provide an ACK response that can be received by wide area network transceiver 204 and/or local area network transceiver 206. Upon receiving the ACK response, the mobile station 108 may compute the RTT using RTT module 222.

As described above, based upon the RTT ranging model, each RTT measurement for WAP 311k may be given by $$RTT_k = 2d_k + \Delta_k + n_k$$

where
- $d_k$ is the actual distance (ft) between the mobile station 108 and the WAP 311k;
- $\Delta_k$ is the actual processing time (ns) for WAP 311k; and
- $n_k$ is Gaussian noise having a mean and variance depending on distance $d_k$.

In the above equation, the units for distance and time are feet and nano-seconds, respectively, so the speed of light propagation may be estimated as ~1 ft/ns. This approximation may be useful as it may obviate multiplication operations when converting between distance and time, thus saving processing time and power consumption.

Using the RTT measurements and the aforementioned RTT ranging model, the distance between the mobile station and each WAP 311k may be estimated (B615). The actual processing time delay $\Delta_k$ for each WAP 311k may be previously determined using manufacturer specifications and/or calibration techniques, and subsequently stored in parameter database 224 for used by the mobile station 108.

Using a second model, a supplemental distance to each WAP may be estimated using another approach(es) which may not rely on the RTT of the signal, but rather some other supplemental information (B620). As used herein, the supplemental distance is the same distance ($d_k$) as discussed above, but it is estimated using techniques other than RTT. In some embodiments, the supplemental information may exploit one or more alternative properties of the signals exchanged between the mobile station 108 and the WAPs 311, such as, for example, amplitude and/or phase. In other embodiments, the supplemental information may a previously determined position. As discussed above, and presented in more detail below in the description of FIG. 7, amplitude (e.g., RSSI) may be used to estimate the supplemental distance.

In other embodiments, other independent sensors may provide supplemental information that may be useful. For example, accelerometers or other forms of networked position determination (AFLT, etc.) may help estimate distances between the WAPs and mobile station 108. Additionally, while SPS signals may be weak and/or intermittent in some of the operating environments of method 600, there may be, in some environments, adequate SPS signal strength which may be sufficient for determining supplemental distances between the mobile station 108 and the WAPs 311.

For example, a mobile station with a set of valid ephemerides may be able to detect when it is indoors vs. outdoors based on its ability to detect satellites. This can help eliminate conditions when a portion of the initial bounded space is outside. If the system has provided WGS84 coordinates for the WAPs or a WGS84 landmark on a map, the mobile station 108 may also be able to use its last-known position from SPS to limit its current position.

In another example, the mobile station 108 may have motion sensor-based information (from motion sensor 212) which may relate its current position to a previously established position. If, for example, a mobile station includes an accelerometer, it may know that it has experienced at most 4 meters of movement from a previously established position It can use that data to limit the range of locations at which it may currently be. A triaxial accelerometer and altimeter might also be combined to determine movement along the Z axis.

Once the two distance estimates to each WAP are determined in B615 and B620, the distance estimates may be processed to generate a combined distance estimate to each WAP (B625). This processing may include any type of statistical and/or deterministic approaches, including kalman filters, fading memory filters, minimal mean square error (MMSE) techniques, etc.

Using the combined distance to each WAP 311k, the mobile station 108 may determine its position using conventional trilateration methods based upon the combined distances and the network geometry (B630).

Figure 7:
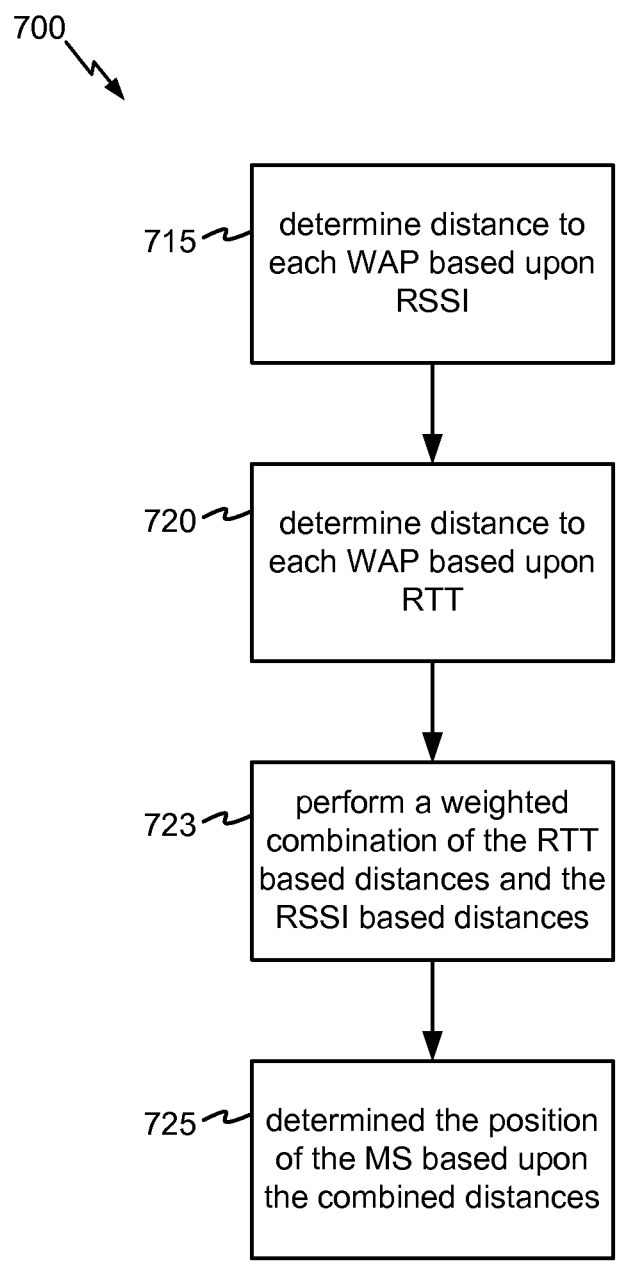
FIG. 7 is flowchart of another embodiment of the process illustrated in FIG. 6, where the distances based upon the measured signal strength (RSSI) and RTT may be combined to improve the position of the mobile station.

FIG. 7 is flowchart of another embodiment 700 providing an alternative approach to the process blocks 615-625 illustrated in FIG. 6. In FIG. 7, the supplemental distances are based upon the measured signal strength RSSI associated with the ACK responses provided by the WAPs 311. The RSSI measurements for each WAP may be mapped to distances using the models described above. These RSSI-based distances may be used in conjunction with RTT-based distances to determine position of the mobile station 108, and to calibrate the processing times of the WAPs 311.

Further referring to FIG. 7, after the RTTs to each WAP 311k have been measured (610, FIG. 6), the distance to each WAP 311k is determined based upon the RSSI (B715). The measured RSSI$_k$ values (for each WAP) may be the average of the RTT ranging packets measured from each WAP 311k. The mobile station 108 may determine the distance to each WAP 311k using RSSI$_k$ based upon the following equation.

$$d_{RSSI,k} = f_d(RSSI_k)$$

$$\sigma_{d_{RSSI,k}}^2 = f_{\sigma^2}(RSSI_k)$$

where $d_{RSSI,k}$ is the distance from mobile station 108 to WAP 311k.

$\sigma_{d_{RSSI,k}}^2$ is the variance of the distance $d_{RSSI,k}$ based upon RSSI$_k$.

$f_d(RSSI_k)$ is a mathematical model relating distance and RSSI.

$f_{\sigma^2}(RSSI_k)$ is a mathematical model relating variance and RSSI.

The mobile station 108 may then estimate the mean and variance of the RTT noise $n_k$. Once the mobile station 108 determines the RTT noise, the following can be estimated.

$$\hat{\mu}_{n,k} = \mu_{n,k}(d_{RSSI,k})$$

$$\hat{\sigma}_{n,k}^2 = \sigma_{n,k}^2(d_{RSSI,k} + 2\sigma_{d_{RSSI,k}})$$

where $\hat{\mu}_{n,k}$ is an estimate of the mean of the RTT noise.

$\hat{\sigma}_{n,k}^2$ is an estimate of the variance of the RTT noise.

$\mu_{n,k}(d_{RSSI,k})$ is a mathematical model of the mean RTT noise as a function of distance to WAP 311k.

$\sigma_{n,k}^2(d_{RSSI,k} + 2\sigma_{RSSI,k})$ is a mathematical model of the variance of the RTT noise as a function of distance to the WAP 311k, where the mobile device adds $2\sigma_{d_{RSSI,k}}$ to take a more conservative estimate of the RTT noise variance.

When the mobile station 108 has no knowledge of the RTT statistics, it may assume, for example, that $\hat{\mu}_{n,k} = 0$ and $\hat{\sigma}_{n,k}^2 = 50$, where RTT timing is estimated using a 20 MHz clock with 50 ns resolution.

The mobile device 108 may then determine the distance to each WAP 311k based upon the measured RTT (B720), and may also determine the variance of the distance based on the measured RTT using the following equations.

$$d_{RTT,k} = \frac{\overline{RTT}_k - \hat{\Delta}_k - \hat{\mu}_{n,k}}{2}$$

$$d_{d_{RTT,k}}^2 = \frac{\sigma_{\hat{\Delta},k}^2 + \hat{\sigma}_{n,k}^2 / m_k}{4}$$

where:

$d_{RTT,k}$ is the RTT-based distance to each WAP 311k.

$\overline{RTT}_k$ is the averaged RTT time over $m_k$ measurements for WAP 311k.

$\hat{\Delta}_k$ is the estimated processing time for WAP 311k $\sigma_{d_{RTT,k}}^2$ is the variance of $d_{RTT,k}$.

$\sigma_{\hat{\Delta},k}^2$ is the variance of $\hat{\Delta}_k$ $\hat{\sigma}_{n,k}^2$ is an estimate of the variance of RTT noise.

$m_k$ is the number RTT measurements associated with WAP 311k.

The mobile station 108 may truncate $d_{RTT,k}$ if necessary to fall between 0 and the maximum WAP 311 range.

Once the RTT-based distance and variance are determined as above, the mobile station 108 may determine a combined distance estimate to each WAP 311k (B723). In one embodiment, the combined distance estimate may be performed using a weighted combination of the RTT-based distance $d_{RTT,k}$ and the RSSI-based distance $d_{RSSI,k}$ for each WAP 311k to determine a distance estimate $d_{est,k}$. This distance estimate may be determined by using a Minimum Mean Square Error (MMSE) estimator based on the following equation:

$$d_{est,k} = \left(\frac{\sigma_{d_{RSSI,k}}^{-2}}{\sigma_{d_{RSSI,k}}^{-2} + \sigma_{d_{RTT,k}}^{-2}}\right) d_{RSSI,k} + \left(\frac{\sigma_{d_{RTT,k}}^{-2}}{\sigma_{d_{RSSI,k}}^{-2} + \sigma_{d_{RTT,k}}^{-2}}\right) d_{RTT,k},$$

with variance estimated as:

$$\sigma_{d_{est,k}}^2 = (\sigma_{d_{RSSI,k}}^{-2} + \sigma_{d_{RTT,k}}^{-2})^{-1}.$$

The above equations may assume that the RSSI and RTT noise can be modeled as uncorrelated and Gaussian.

The above distance estimator may rely on RSSI when $\sigma_{d_{RTT,k}}^2$ is large, either from uncertainty in the processing time or very noisy RTT measurements. However, once the processing time is known (e.g., low $\sigma_{\hat{\Delta},k}^2$) the above MMSE estimator may put more weight on the RTT measurements.

Once the set of distances $\{d_{est,k}\}$ to each WAP 311k have been determined, the method may then proceed to Block 725, where the position of the mobile device 108 may be determined using known trilateration techniques. In other embodiments, triangulation or other positioning algorithms may be used. The distances with lower variance $\sigma_{dst,k}^2$ may be given more weight in the algorithm. The trilateration algorithm may also utilize past localization data to perform trajectory smoothing using, for example, Kalman filtering.

III. Updating the Ranging Models to Improve Position Determination

In order to improve the position determination process, various embodiments of the invention provide for updating the ranging models to improve their accuracy in an adaptive manner. In one embodiment, the processing times $\hat{\Delta}_k$ associated with each WAP 311k used in the RTT ranging model may be updated using an iterative approach. Thus, these processing times $\hat{\Delta}_k$ can be refined through a "learning" process to arrive at better values. In other embodiments, the RSSI ranging models may be adjusted using an adaptive process to improve their fidelity. Different aspects of the models may be continuously monitored and updated if it is determined that the model should be improved.

Figure 8:
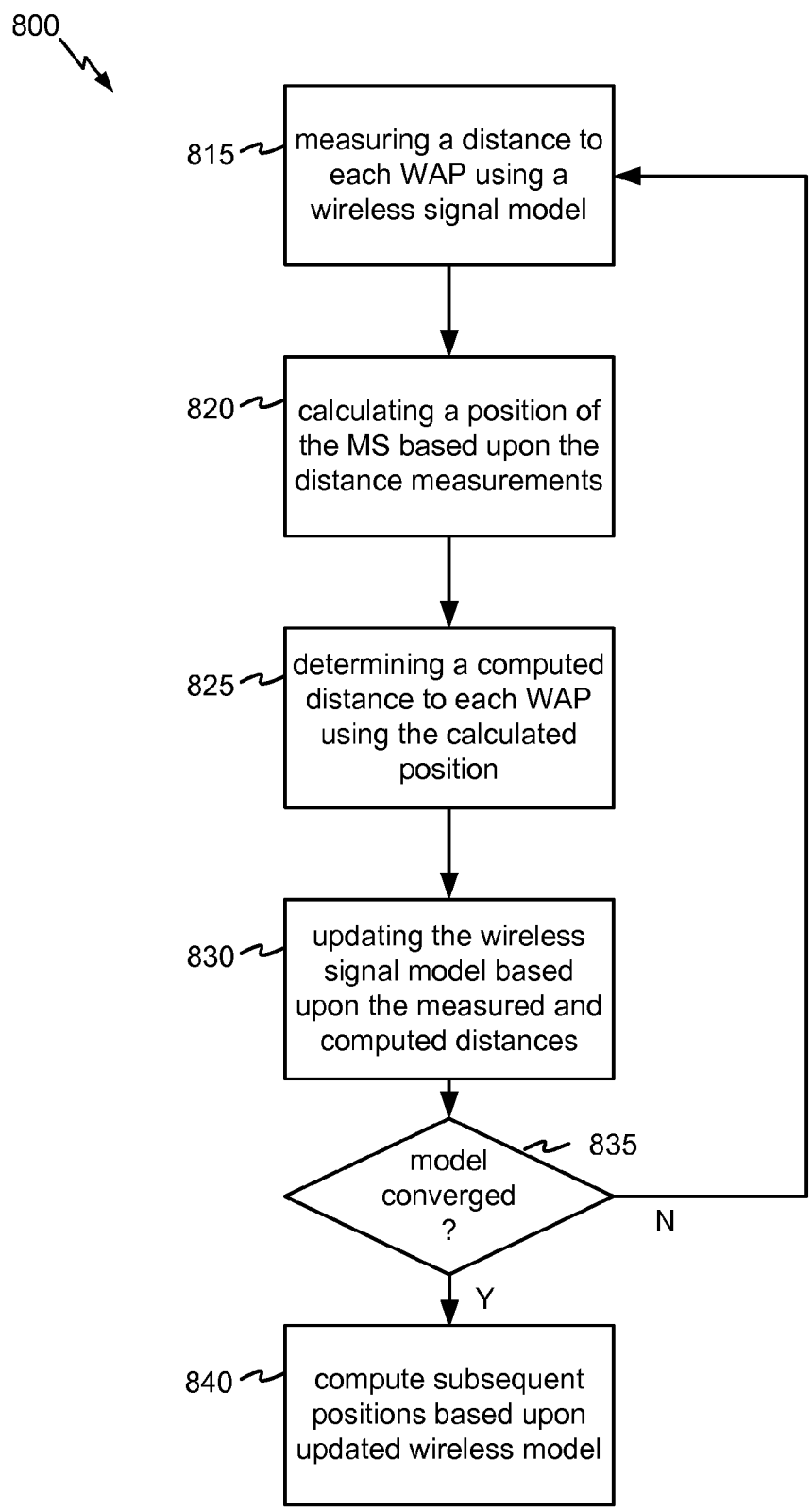
FIG. 8 shows a flowchart illustrating an exemplary method for adaptively improving a wireless signal model.

FIG. 8 shows a flowchart illustrating an exemplary method 800 for adaptively improving a wireless signal model. The mobile station 108 may measure the distance to each WAP 311k using a wireless signal model (B815). While only one model is discussed here for ease of explanation, other embodiments may use a plurality of wireless signal models. A position of the mobile station 108 may then be calculated using conventional localization (e.g., trilateration) techniques (B820). Once the mobile station 108 position has been estimated, mobile station 108 may compute the distance between the estimated position and each WAP 311k. Using the computed distances determined in B825 and the measured distances determined in B815, mobile station 108 may update the wireless signal model to improve its fidelity. As will be shown below, for example, the RTT ranging model may be improved by updated the processing time $\hat{\Delta}_k$ associated with each WAP 311k. In other embodiments, coefficients associated with the RSSI ranging model may be updated, as will also be described in more detail below.

Once the model is updated in B830, a test may be performed to determine if the model has converged (B835). This test may be a simple threshold of a parameter of interest in the model, or may be a more sophisticated metric based on statistical measurements. Once the model has converged, any further iterations may only bring marginal improvements to the model and are thus may not be worth performing. If no further convergence is observed in B835, then subsequent position determinations may be performed using the updated wireless model (B840).

3.1 Updating the RTT Model Using Minimum Mean Square Error

Further referring to FIG. 8, in another embodiment of the process 800 described above, the details are provided below when the wireless signal model is the RTT ranging model. Once the position of the mobile station has been determined, the mobile station 108 may update the estimated processing times $\hat{\Delta}_k$ for each WAP 311k based upon the position. After performing the position determination in B820 (e.g., trilateration), the mobile station 108 has the option of updating a local (e.g., parameter database 224) or remote database with information about the processing times $\hat{\Delta}_k$, observed WAPs 311k (e.g., based upon MACID). Embodiments allow the localization system to learn and adapt over time by varying each $\hat{\Delta}_k$, without requiring a substantial up-front deployment cost.

Below more details are presented for allowing the mobile station 108 to update its estimate of the processing delay. This algorithm may assume that the trilateration error at the current position in space is uncorrelated with previous measurements. That is, the mobile station 108 should perform this processing delay update procedure when it has moved sufficiently far from its previous location in space. The mobile station 108 could estimate such movement detecting a large change in the RSSI or RTT measurements and/or by utilizing other sensors (e.g., motion sensor 212).

After trilateration, the mobile station 108 may calculate the distance $d_{tri,k}$ between the estimated position and WAP 311k. The average round-trip time $\overline{RTT}_k$ and the post-trilateration distance $d_{tri,k}$ may be related via the following matrix equation:

$$\begin{bmatrix} \overline{RTT}_k \\ d_{tri,k} \end{bmatrix} = \begin{bmatrix} 1 & 2 \\ 0 & 1 \end{bmatrix} \begin{bmatrix} \Delta_k \\ d_k \end{bmatrix} + \begin{bmatrix} \overline{n}_k \\ \varepsilon_k \end{bmatrix}$$

where $\Delta_k$ is the exact processing time delay for WAP 311k, $d_k$ is the exact distance to WAP 311k, $\overline{n}_k$ is the average noise in the RTT measurements, and $\varepsilon_k$ is the post-trilateration error. Let us define the post-trilateration error variance, which is unknown, as $\sigma_{d_{tri}}^2 = E[\varepsilon_k^2]$. A reasonable heuristic may be to take the average variance of the pre-trilateration distances, modeled using the following equation, as trilateration may have an averaging effect on the positioning error:

$$\sigma_{d_{tri,k}}^2 = \sigma_{d_{tri}}^2 = \frac{1}{K} \sum_{k=1}^{K} \sigma_{d_{est,k}}^2$$

The mobile station 108 can model all variables on the right side of the above matrix equation as being uncorrelated and normally distributed as described below.

$$\hat{\Delta}_k \sim N(\hat{\Delta}_k, \sigma_{\hat{\Delta},k}^2)$$

$$d_k \sim N(d_{RSSI,k}, \sigma_{d_{RSSI,k}}^2)$$

$$\bar{n}_k \sim N(\hat{\mu}_{n,k}, \hat{\sigma}_{n,k}^2/m_k)$$

$$\epsilon_k \sim N(0, \sigma_{d_{tri,k}}^2)$$

The mobile station 108 can then form an updated estimate of the processing time delays using minimum mean square error (MMSE) techniques as shown using the equations below:

$$\hat{\Delta}_{k,new} = \left(\frac{\sigma_{\hat{\Delta},k,new}^2}{\sigma_{\hat{\Delta},k}^2}\right)\hat{\Delta}_k + \left(1 - \frac{\sigma_{\hat{\Delta},k,new}^2}{\sigma_{\hat{\Delta},k}^2}\right)\hat{\Delta}_{k,measured}, \text{ where}$$

$$\sigma_{\hat{\Delta},k,new}^2 = \left(\frac{1}{\sigma_{\hat{\Delta},k}^2} + \frac{1}{\hat{\sigma}_{n,k}^2/m_k + 4(\sigma_{d_{RSSI,k}}^{-2} + \sigma_{d_{tri,k}}^{-2})^{-1}}\right)^{-1}, \text{ and}$$

$$\hat{\Delta}_{k,measured} =$$

$$\overline{RTT}_k - \hat{\mu}_{n,k} - 2\left(\frac{\sigma_{d_{RSSI,k}}^{-2}}{\sigma_{d_{RSSI,k}}^{-2} + \sigma_{d_{tri,k}}^{-2}} d_{RSSI,k} + \frac{\sigma_{d_{tri,k}}^{-2}}{\sigma_{d_{RSSI,k}}^{-2} + \sigma_{d_{tri,k}}^{-2}} d_{tri,k}\right).$$

The new processing time $\hat{\Delta}_{k,new}$ may be a weighted sum of the current processing time $\hat{\Delta}_k$ and a measured processing time $\hat{\Delta}_{k,measured}$ that may be derived from the RTT measurements, the RSSI distances, and the post-trilateration distances. The weights may depend on the estimated variance of the processing time. During the early stages of learning, typically $\sigma_{\hat{\Delta},k,new}^2 \ll \sigma_{\hat{\Delta},k}^2$ and the processing time is updated with $\hat{\Delta}_{k,new} \approx \hat{\Delta}_{k,measured}$. During the intermediate stages $\hat{\Delta}_{k,new}$ may be updated whenever the measurements cause a substantial decrease in $\sigma_{\hat{\Delta},k}^2$. Once $\hat{\Delta}_k$ has converged, based on $\sigma_{\hat{\Delta},k,new}^2 \approx \sigma_{\hat{\Delta},k}^2$ the processing time may reach a steady state with $\hat{\Delta}_{k,new} \approx \hat{\Delta}_k$.

3.2 Updating the RSSI Model Using Iterative Techniques

Figure 9:
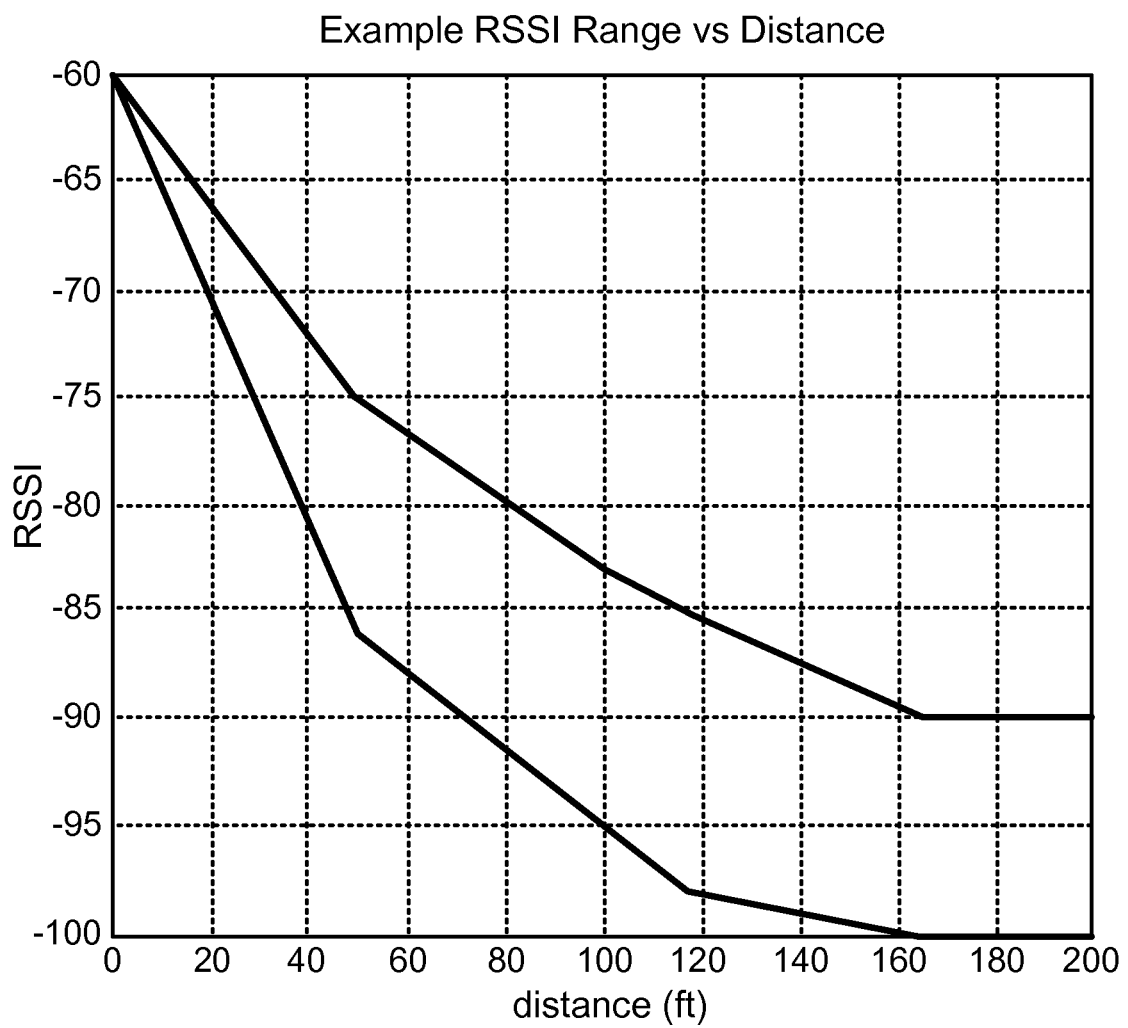
FIG. 9 is a graph of exemplary ranging models used to determine the distance between a mobile station and a wireless access point based upon RSSI.

In another embodiment of the process shown in FIG. 8, the wireless signal model may be based upon an RSSI ranging model. FIG. 9 is a graph of exemplary ranging models used to determine the distance between a mobile station and a wireless access point based upon RSSI. In various embodiments, the mobile station 108 may "listen" for signals transmitted by each WAP 311k, where the signals may be in the form of beacons. The signal strength of each transmission may be converted to a distance using a model that may be based on the deployment environment, such as, for example, an office building or shopping mall. As shown in FIG. 9 the exemplary plot of RSSI vs. distance is representative of an indoor environment, with upper and lower bounds being shown. These bounds may be based upon the variance of the RSSI. In other embodiments, as will be described in more detail below for FIG. 10, the model may be based on propagation models based upon a map of the WAP deployment.

The models may be used to convert signal strength to a distance for each WAP 311k. An initial distance estimate may be determined by the midpoint of the min/max range from the RSSI, although more sophisticated approaches may be used. Trilateration may be performed using the initial distance estimates to roughly approximate the position of the mobile station 108. In some embodiments, the variance of the RSSI measurements may be used to weight distance estimates based upon confidence prior to trilateration (e.g., low variance distance estimates may be weighted higher than high variance estimates). Moreover, multiple measurements may be performed to each WAP 311 in a short time interval to reduce noise via averaging, filtering, and/or other processing. In other embodiments, various model(s) may provide an average distance, and a variance in this distance, as a function of RSSI.

Advantages of using such a model may include: avoiding time-consuming fingerprinting of the environment of interest; generating no additional wireless traffic to determine the estimates; and utilizing standard wireless protocols (e.g., 802.11a/b/g/n, etc.) without having to alter them.

Figure 10:
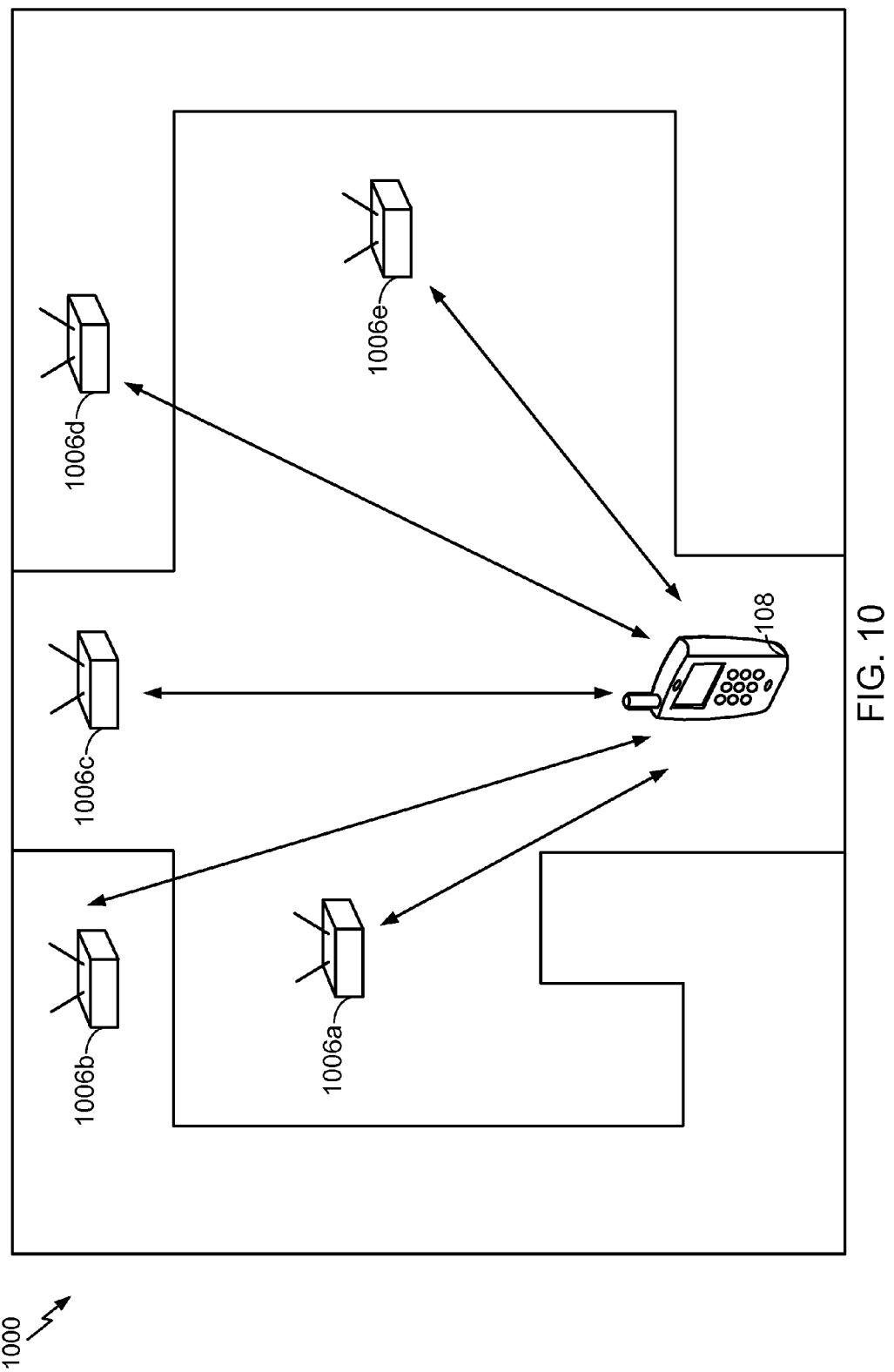
FIG. 10 is a diagram of an exemplary indoor environment which may be modeled to improve distance estimates between wireless access points and a mobile station based upon RSSI.

FIG. 10 illustrates a diagram of an exemplary indoor environment 1000 which may be modeled to improve distance estimates between wireless access points and a mobile station based upon RSSI. In this environment, the mobile station 108 may be able to exchange wireless signals with a plurality of Local Area Network Wireless Access Points (LAN-WAPs) 1006. Some LAN-WAPs, for example, 1006a, 1006c, and 1006e, may be within direct line of sight with the mobile station 108. One may expect, in the absence of other forms of electronic interference, that the signals received from LAN-WAPs 1006a 1006c, and 1006e would be relatively strong. Other LAN-WAPs, for example 1006b and 1006d, may reside in different rooms, and may have the signals attenuated by building obstructions such as walls. The attenuation of signals exchanged with LAN-WAPs 1006b and 1006e may vary depending upon the material used in the construction of the walls. RSSI models relating distance and signal strength may be generated based upon the indoor environment 1000. Such models may include the geometry of each LAN-WAP in relation to the mobile device 108, and/or geometry of each LAN-WAP in relation to the obstructions within the environment. Furthermore, such models may also include other factors affecting the signal, such as, for example, the material of the obstructions to module their attenuation effects (e.g. metal walls versus drywall), the radiation patterns of the LAN-WAP antennas, interfering signals from undesired sources (e.g., other WAPs external to the LAN), the make and model of each individual LAN-WAP 1006, etc.

In some embodiments, the mobile station may already be receiving the LAN-WAP network geometry through a particular channel. Such as channel may be used to provide information about the local conditions which may be presumed to exist. For example, the channel may be used to provide a ray-tracing based model of the local conditions which would improve on the fidelity of the base RSSI model. This model might be provided in the forms as detailed as the ray-tracing of the venue or as simple as a reference to a known set of general models (e.g. "auditorium", "cube farm", "high-rise office"). In other embodiments, a full map of the environment may be provided, and the mobile station 108 may also produce its own ray-tracing model, and/or perform pattern-matching to pick a more appropriate RSSI model.

In other embodiments, the RSSI model may be dynamic in nature, and thus can be refined in an iterative manner over time as the mobile station 108 moves throughout the environment 1000. For example, the mobile station 108 may initially start with a simple model of how the RSSI behaves with distance (for example, as described above in FIG. 5 and FIG. 9), using a ray-tracing model generated from a map of the environment, and/or from a generic model such as office, warehouse, mall, etc. The mobile station 108 may then move around the environment, localizing itself using the positioning algorithm described in above. Deviations from the model may be compared, and the model updated, based upon the computed position of the mobile station 108.

3.3 Updating the RTT Module by Bounding Range Using the RSSI Model

Figure 11:
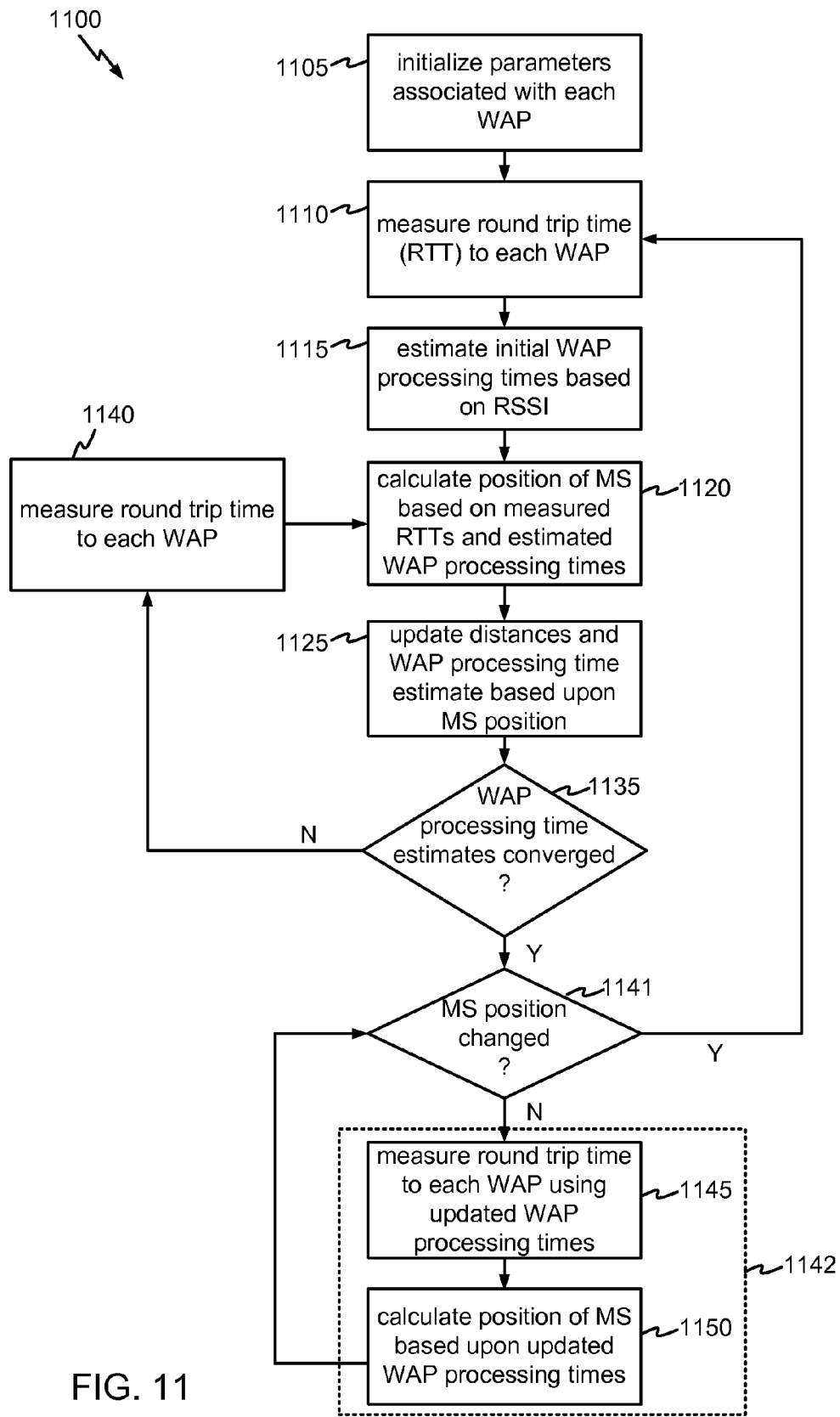
FIG. 11 is a flowchart illustrating another exemplary method which uses both RSSI and RTT ranging models for position determination, wherein the RTT model is adaptive model.

FIG. 11 is a flowchart showing another exemplary process 1100 for which uses both RTT and RSSI ranging modules for determining the position of a mobile station and adaptively improving the RTT model.

In this embodiment, the mobile station may determine an initial estimation of the WAP 311 processing times based on the known limitations of the WAP radio ranges. The mobile station 108 may calculate its position using a trilateration algorithm, where typically at least three WAPs 311 are visible in two-dimensional space. The mobile station may perform updates to prior estimates of the WAP 311 processing times by comparing its most recent calculated position with prior position solutions. Using the updated position calculations and additional RTT measurements, the mobile station 108 may continue refining the processing time estimate as more measurements are taken. The details of this process are presented below.

Process 1100 may start out by having the mobile device 108 initialize various parameters associated with each WAP 311$k$ (B1105). This process may be similar to the initialization described in B605. The mobile station 108 may then perform RTT measurements to each WAP 311$k$ (B1110). As before, the model for RTT may be provided as:

$$RTT_k = 2d_k + \Delta_k + n_k,$$

where
  $d_k$ is the actual distance (ft) between the mobile station 108 and the WAP 311$k$;
  $\Delta_k$ is the actual processing time (ns) for WAP 311$k$; and
  $n_k$ is uniform noise having a mean and variance depending on distance $d_k$.

As in the previous embodiment, the foregoing method may estimate the processing time $\Delta_k$ for each WAP 311$k$. Note that this model differs from model used in the aforementioned process 800 described above in 3.1, in that the noise $n_k$ may be modeled here using a uniform distribution, whereas in process 800 a Gaussian distribution may be used. The noise $n_k$ may be mitigated by averaging several measurements taken in the same location. This assumption may be reasonable if the mobile station 108 is stationary or moving at low speed.

One may note that, as presented above, because the units for distance and time are in feet and nano-seconds, respectively, the speed of light propagation may be estimated as ~1 ft/ns.

Once $RTT_k$ are determined, the mobile station may determine an initial estimate of each WAP 311$k$ processing time $\hat{\Delta}_k$ based upon signal strength measurements (B1115).

By determining the strength of one or more received packets used in making the RTT measurements in Block 1110, the mobile station 108 can bracket the distance $d_k$ a WAP 311$k$ to be in an interval between a maximum range ($R_{k,min}$) and a minimum range ($R_{k,min}$ as represented by the equation below.

$$R_{k,min} \leq d_k \leq R_{k,max}$$

If the processing time is different for each WAP 311$k$, the initial estimate of processing time $\hat{\Delta}_{k,init}$ may be approximated as the midpoint of the above interval for each WAP 311$k$:

$$\hat{\Delta}_{k,init} = E[RTT_k - n_k - R_{k,min} - R_{k,max}] = RTT_k - R_{k,min} - R_{k,max}.$$

If the processing time is the same for each WAP 311$k$, the initial estimate of processing time $\hat{\Delta}_{k,init}$ may be approximated as the midpoint of the intersection of the above intervals for WAPs 311:

$$\hat{\Delta}_{k,init} = \hat{\Delta}_k = \frac{\max(RTT_k - 2R_{k,max}) + \min(RTT_k - 2R_{k,min})}{2}.$$

The process 1100 may next calculate the position of the mobile station based on the measured RTTs and then WAP processing time estimates (B1120). To determine position, the mobile station 108 may convert the RTT measurements associated with each WAP 311$k$ to an estimated distance $\hat{d}_k$. The estimated distance to each WAP 311$k$ may be determined using the following equation.

$$\hat{d}_k = \max\left(0, \frac{RTT_k - \hat{\Delta}_k}{2}\right)$$

Once the set of estimated distances $\{\hat{d}\}$ are determented for the available WAPs 311$k$, the mobile station 108 may calculate its position (x,y) using trilateration. Typically, the error in the calculated position (x,y) is less that the error associated with each estimated distance.

The process may then update the distance to each WAP 311 then determine a new processing time for each WAP based upon the new distance (B1125). The new distance to each WAP 311$k$ may be determined using the following equation.

$$\hat{d}'_k = \|(x,y) - (x_k, y_k)\|$$

where
  (x, y) is the most recent position of the mobile station
  ($x_k$, $y_k$) is the position of each WAP 311$k$ From the new distance estimate $\hat{d}'_k$, the mobile station 108 may update the processing time estimate $\hat{\Delta}'_k$ using the following equation, when each WAP 311$k$ has a different processing time.

$$\hat{\Delta}'_k = RTT_k - 2\hat{d}'_k;$$

If it may be assumed that each WAP 311$k$ has substantially the same processing time, the following equation may be used to update the processing time estimate.

$$\hat{\Delta}' = \mathrm{mean}(RTT_k - 2\hat{d}'_k)$$

A test may be performed to determine if further iterations should be made to further refine the processing time estimates. In one embodiment, the WAP 311 processing estimates may be tested to determine if they have converged (B1135). Alternatively, a test may be performed on the distances to each WAP, or a mathematical functions thereof (e.g., mean distances), to determine whether further refinements to the processing time should be performed. If further iterations are useful, the process 1100 may loop back to Block 1140, where the round trip time to each WAP 311$k$ is measured again. One should appreciate that multiple measurements may be performed, and may be mathematically combined with prior measurements (e.g., averaging, FIR/IIR filtering, etc.), to mitigate the effects of noise. The new RTT measurements may then be used in a reiteration of Blocks 1120 through 1125 to refine the processing time estimate $\hat{\Delta}'_k$ associated with each WAP 311$k$.

If in B1135 it is determined that no further refinements to processing time should be performed, the process 1100 may then monitor the position of the mobile station 108 to determine whether its position has changed (B1141). If so, the mobile station 108 may repeat the process 1100 starting looping back to Block 1110. In this case, if new WAPs are discovered, the initial processing times may be computed as described above in Block 1115. However, for WAPs that are in still in range which already have had refined processing times determined (assuming that they are different), the refined times for these WAPs may be used to improve the efficiency of the process 1100. If it is determined in Block 1141 that the position of the mobile station 108 has not changed, the mobile station may monitor its position to detect changes in position (B1142).

In some embodiments, determining whether the mobile station 108 has changed position in Block 1141 may be accomplished using the motion sensor 212, or some other form of position determination (e.g., AFLT, GPS, etc.) In these embodiments, the motion state of the mobile device may be monitored, and once motion is detected, the process resumes as described above.

In other embodiments, where the mobile station may not have a motion sensor 212, or the environment prevents motion detection through other means (e.g., insufficient signal coverage for GPS and/or AFLT), the mobile station may monitor its position in Block 1142 by continuing to measure RTT to each WAP 311*k* using the updated processing times (B1145), and then determining its position (B1150) based upon the updated WAP processing time as described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for determining a processing time for wirelessly determining a position of a mobile station, comprising:
   sending, by a transceiver within a mobile station, one or more requests to a network of wireless access points;
   receiving, by the transceiver, a response from each of a plurality of access points of the network of access points;
   determining, by a processor within the mobile station, a round trip time delay from the mobile station to each of the plurality of access points, the round trip time delay for each access point of the plurality of access points including:
      a first propagation time from the sending of a one of the requests by the transceiver to a receipt of the request by the respective one of the plurality of access points,
      a processing time from the receipt of the request by the respective access point to the sending of the response by the access point to the mobile station, and a second propagation time from the sending of the response by the access point to a receipt of the request by the transceiver;

estimating, by the processor, the processing time for each of the plurality of access points;

calculating, by the processor, a position of the mobile station based upon the determined round trip time delays and the estimated processing times; and updating, by the processor, the estimated processing time for each of the plurality of access points based upon the calculated position of the mobile station.

2. The method of claim 1, further comprising:
determining that the updated processing times have not converged;
determining a new round trip time delay to each of the plurality of wireless access points;
calculating a new position of the mobile station using the new round trip time delays and the updated processing times; and
refining the updated processing time for each of the plurality of wireless access points based upon the new position of the mobile station.

3. The method of claim 1, further comprising:
determining that the updated processing times have converged;
determining that the mobile station has changed position;
determining a new round trip time delay to each of a second plurality of wireless access points; and
calculating a new position of the mobile station using the new round trip time delays and the updated processing times.

4. The method of claim 1, wherein determining a round trip time delay to each of the plurality of wireless access points comprises:
transmitting a packet from the mobile station to the access point;
recording a first time when the transmitted packet was transmitted;
receiving a response packet from the wireless access point in response to the transmitted packet;
recording a second time when the response packet was received; and
computing a time difference between the second recorded time and the first recorded time.

5. The method of claim 4, wherein each transmitted packet is a unicast packet directed to a respective access point, and wherein the mobile station does not associate with the respective wireless access point.

6. The method of claim 4, wherein the mobile station associates with each of the wireless access points from which a response packet is received.

7. The method of claim 4, wherein the mobile station and the wireless access points operate in accordance with IEEE 802.11 standards, cellular piconet, cellular femtocell, and/or Bluetooth networking standards.

8. The method of claim 1, wherein estimating the processing time for each of the plurality of access points includes:
determining a received signal strength of a packet received from the wireless access point;
estimating a distance to the wireless access point based upon the determined signal strength; and
calculating the estimated processing time for the wireless access point based upon the estimated distance.

9. The method of claim 8, wherein the distance to each wireless access point is estimated to within a respective interval based upon the received signal strength, the interval being defined by a respective maximum value and a respective minimum value.

10. The method of claim 9, wherein when the processing times for at least two of the plurality of wireless access points are substantially different, the estimated processing time for each wireless access point is determined based on a midpoint of its respective interval between the respective maximum value and the respective minimum value.

11. The method according to claim 9, wherein when the processing times for the wireless access points are substantially similar, the processing time for each of the plurality of access points is determined based on a midpoint of an intersection of all of the respective intervals of all of the plurality of wireless access points.

12. A method for determining a processing time for wirelessly determining a position of a mobile station, comprising:
determining, by a processor within the mobile station, a round trip time delay from the mobile station to each of a plurality of wireless access points;
estimating, by the processor, a processing time for each of the plurality of access points;
calculating, by the processor, a position of the mobile station based upon the determined round trip time delays and the estimated processing times, the calculating including:
selecting among the plurality of wireless access points based upon received signal strengths from the plurality of access points;
determining a position of each of the selected wireless access points;
calculating a distance between the mobile station and each of the selected wireless access points using the determined round trip time delay to the respective access point and the estimated processing time for the respective access point; and
performing trilateration based upon the calculated distances to the selected access points and the determined positions of the selected access points; and
updating, by the processor, the estimated processing time for each of the selected access points based upon the calculated position of the mobile station.

13. The method of claim 12, wherein the determined positions of the selected wireless access points are defined in a standard coordinate system.

14. The method of claim 1, wherein updating the estimated processing time for each of the plurality of wireless access points comprises:
calculating a distance to each of the plurality of wireless access points based on the calculated position of the mobile station and a position of the respective wireless access point; and
computing the updated processing time for the wireless access point based upon the determined round trip time delay to the wireless access point and the calculated distance to the wireless access point.

15. An apparatus for determining a processing time for wirelessly determining a position of a mobile station, comprising:
a wireless transceiver;
a processor coupled to the wireless transceiver; and
a memory coupled to the processor, wherein the memory stores executable instructions and data for causing the processor to
cause the transceiver to send one or more requests to a network of access points;

receive from the transceiver a response from each of a plurality of access points of the network of access points;

determine a round trip time delay from the mobile station to each of the plurality of access points, the round trip time delay for each access point of the plurality of access points including:

a first propagation time from the sending of a one of the requests by the transceiver to a receipt of the request by the respective one of the plurality of access points, a processing time from the receipt of the request by the respective access point to the sending of the response by the access point to the mobile station, and a second propagation time from the sending of the response by the access point to a receipt of the request by the transceiver, estimate the processing time for each of the plurality of access points, calculate a position of the mobile station based upon the determined round trip time delays and the estimated processing times, and update the estimated processing time for each of the plurality of access points based upon the calculated position of the mobile station.

16. The apparatus of claim 15, further comprising instructions causing the processor to determine that the updated processing times have not converged, determine a new round trip time delay to each of the plurality of wireless access points, calculate a new position of the mobile station using the new round trip time delays and the updated processing times, and refine the updated processing time for each of the plurality of wireless access points based upon the new position of the mobile station.

17. The apparatus of claim 15, further comprising instructions causing the processor to determine that the updated processing times have converged, determine that the mobile station has changed position, determine a new round trip time delay to each of a second plurality of wireless access points, and calculate a new position of the mobile station using the new round trip time delays and the updated processing times.

18. The apparatus of claim 15, wherein the instructions to determine a round trip time delay to each of the plurality of wireless access points include instructions for causing the processor to transmit a packet from the mobile station to the access point, record a first time when the transmitted packet was transmitted, receive a response packet from the wireless access point in response to the transmitted packet, record a second time when the response packet was received, and compute a time difference between the second recorded time and the first recorded time.

19. The apparatus of claim 18, wherein each transmitted packet is a unicast packet directed to a respective access point, and wherein the mobile station does not associate with the respective wireless access point.

20. The apparatus of claim 18, wherein the mobile station associates with each of the wireless access points from which a response packet is received.

21. The apparatus of claim 18, wherein the mobile station and the wireless access points operate in accordance with IEEE 802.11 standards, cellular piconet, cellular femtocell, and/or Bluetooth networking standards.

22. The apparatus of claim 15, wherein the instructions to estimate the processing time for each of the plurality of access points include instructions for causing the processor to determine a received signal strength of a packet received from the wireless access point, estimate a distance to the wireless access point based upon the determined signal strength, and calculate the estimated processing time for the wireless access point based upon the estimated distance.

23. The apparatus of claim 22, wherein the distance to each wireless access point is estimated to within a respective interval based upon the received signal strength, the interval being defined by a respective maximum value and a respective minimum value.

24. The apparatus according to claim 23, when the processing times for at least two of the plurality of wireless access points are substantially different, the estimated processing time for each wireless access point is determined based on a midpoint of its respective interval between the respective maximum value and the respective minimum value.

25. The apparatus according to claim 23, wherein when the processing times for the wireless access points are substantially similar, the processing time for each of the plurality of access points is determined based on a midpoint of an intersection of all of the respective intervals of all of the plurality of wireless access points.

26. An apparatus for determining a processing time for wirelessly determining a position of a mobile station, comprising:

a wireless transceiver;

a processor coupled to the wireless transceiver; and a memory coupled to the processor, wherein the memory stores executable instructions and data for causing the processor to determine a round trip time delay from the mobile station to each of a plurality of wireless access points, estimate a processing time for each of the plurality of access points, calculate a position of the mobile station based upon the determined round trip time delays and the estimated processing times, the instructions to calculate the position including instructions for causing the processor to select among the plurality of wireless access points based upon received signal strengths from the plurality of access points, determine a position of each of the selected wireless access points, calculate a distance between the mobile station and each of the selected wireless access points using the determined round trip time delay to the respective access point and the estimated processing time for the respective access point, and perform trilateration based upon the calculated distances to the selected access points and the determined positions of the selected access points, and update the estimated processing time for each of the selected access points based upon the calculated position of the mobile station.

27. The apparatus of claim 15, wherein the instructions to update the estimated processing time for each of the plurality of wireless access points include instructions for causing the processor to
- calculate a distance to each of the plurality of wireless access points based on the calculated position of the mobile station and a position of the respective wireless access point, and
- compute the updated processing time for the wireless access point based upon the determined round trip time delay to the wireless access point and the calculated distance to the wireless access point.

28. An apparatus for determining a processing time for wirelessly determining a position of a mobile station, comprising:
- means for sending one or more requests to a network of wireless access points;
- means for receiving a response from each of a plurality of access points of the network of access points;
- means for determining a round trip time delay from the mobile station to each of the plurality of access points, the round trip time delay for each access point of the plurality of access points including:
  - a first propagation time from the sending of a one of the requests by the transceiver to a receipt of the request by the respective one of the plurality of access points,
  - a processing time from the receipt of the request by the respective access point to the sending of the response by the access point to the mobile station, and
  - a second propagation time from the sending of the response by the access point to a receipt of the request by the transceiver;
- means for estimating the processing time for each of the plurality of access points;
- means for calculating a position of the mobile station based upon the determined round trip time delays and the estimated processing times; and
- means for updating the estimated processing time for each of the plurality of access points based upon the calculated position of the mobile station.

29. A non-transitory computer-readable storage medium having stored therein computer instructions that executable by a processor of a mobile station to:
- initiate transmission of one or more requests to a network of wireless access points; obtain a response from each of a plurality of access points of the network of access points;
- determine a round trip time delay from the mobile station to each of the plurality of access points, the round trip time delay for each access point of the plurality of access points including:
  - a first propagation time from the sending of a one of the requests by the transceiver to a receipt of the request by the respective one of the plurality of access points,
  - a processing time from the receipt of the request by the respective access point to the sending of the response by the access point to the mobile station, and
  - a second propagation time from the sending of the response by the access point to a receipt of the request by the transceiver;
- estimate the processing time for each of the plurality of access points;
- calculate a position of the mobile station based upon the determined round trip time delays and the estimated processing times; and
- update the estimated processing time for each of the plurality of access points based upon the calculated position of the mobile station.

* * * * *